United States Patent
Hwang et al.

(10) Patent No.: US 10,631,279 B2
(45) Date of Patent: **\*Apr. 21, 2020**

(54) UPLINK TRANSMISSION METHOD AND UPLINK TRANSMISSION DEVICE

(71) Applicant: LG ELECTRONICS INC., Seoul (KR)

(72) Inventors: Daesung Hwang, Seoul (KR); Yunjung Yi, Seoul (KR); Bonghoe Kim, Seoul (KR); Dongyoun Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,401

(22) Filed: Dec. 10, 2018

(65) Prior Publication Data
US 2019/0159195 A1 May 23, 2019

Related U.S. Application Data

(63) Continuation of application No. 14/427,557, filed as application No. PCT/KR2013/007025 on Aug. 5, 2013, now Pat. No. 10,194,423.
(Continued)

(51) Int. Cl.
*H04W 72/04* (2009.01)
*H04W 72/12* (2009.01)
(Continued)

(52) U.S. Cl.
CPC .......... *H04W 72/0413* (2013.01); *H04B 7/02* (2013.01); *H04W 72/0446* (2013.01);
(Continued)

(58) Field of Classification Search
CPC . H04W 52/34; H04W 72/02; H04W 72/0413; H04W 72/0473; H04W 72/10;
(Continued)

(56) References Cited

U.S. PATENT DOCUMENTS

| | | |
|---|---|---|
| 8,125,921 B2 | 2/2012 | Frenger et al. |
| 9,210,695 B2 | 12/2015 | Kim et al. |
| | (Continued) | |

FOREIGN PATENT DOCUMENTS

| | | |
|---|---|---|
| CN | 101977099 | 2/2011 |
| CN | 102474495 | 5/2012 |
| | (Continued) | |

OTHER PUBLICATIONS

U.S. Appl. No. 14/427,557, Final Office Action dated Apr. 5, 2018, 13 pages.
(Continued)

*Primary Examiner* — Mounir Moutaouakil
(74) *Attorney, Agent, or Firm* — Lee, Hong, Degerman, Kang & Waimey

(57) ABSTRACT

One embodiment of the present specification discloses an uplink transmission method in a multi-cell environment in which a single uplink resource is shared. The method may comprise: receiving control information that configures an uplink control channel and an uplink shared channel so that the uplink control channel and the uplink shared channel are not simultaneously transmitted on the same one uplink subframe, wherein the single uplink resource is shared by a first cell and a second cell; selecting any one of the uplink control channel and the uplink shared channel if a first Scheduling Request (SR) for the first cell and Uplink Control Information (UCI) for the second cell are requested to be simultaneously transmitted on the same subframe through the uplink control channel and the uplink shared channel, respectively; sending the selected channel on the uplink subframe.

12 Claims, 17 Drawing Sheets

Related U.S. Application Data

(60) Provisional application No. 61/706,785, filed on Sep. 28, 2012.

(51) Int. Cl.
*H04B 7/02* (2018.01)
*H04W 28/12* (2009.01)
*H04L 5/00* (2006.01)

(52) U.S. Cl.
CPC ....... *H04W 72/1268* (2013.01); *H04L 5/0057* (2013.01); *H04W 28/12* (2013.01)

(58) Field of Classification Search
CPC ............. H04W 72/1284; H04L 1/0026; H04L 1/1671; H04L 1/1861; H04L 5/001; H04L 5/0053; H04L 5/0055; H04L 5/0057
See application file for complete search history.

(56) References Cited

U.S. PATENT DOCUMENTS

| | | | |
|---|---|---|---|
| 9,225,495 B2 | 12/2015 | Palanki et al. | |
| 9,247,563 B2 | 1/2016 | Anderson et al. | |
| 9,265,008 B2 | 2/2016 | Park et al. | |
| 9,485,060 B2 | 11/2016 | Nayeb Nazar et al. | |
| 9,893,792 B2 | 2/2018 | Han et al. | |
| 9,930,677 B2 | 3/2018 | Choudhury et al. | |
| 2009/0005058 A1 | 1/2009 | Kazmi et al. | |
| 2010/0167665 A1 | 7/2010 | Zetterman | |
| 2010/0195575 A1 | 8/2010 | Papasakellariou et al. | |
| 2010/0309867 A1 | 12/2010 | Palanki et al. | |
| 2011/0268028 A1 | 11/2011 | Stern-Berkowitz et al. | |
| 2012/0127931 A1 | 5/2012 | Gaal et al. | |
| 2012/0140708 A1 | 6/2012 | Choudhury et al. | |
| 2013/0155898 A1 | 6/2013 | Yin et al. | |
| 2014/0056278 A1* | 2/2014 | Marinier ............. | H04W 72/044 370/330 |
| 2014/0079002 A1* | 3/2014 | Chen ................... | H04W 52/146 370/329 |
| 2014/0092785 A1 | 4/2014 | Song et al. | |
| 2014/0112300 A1 | 4/2014 | Han et al. | |
| 2014/0256311 A1 | 9/2014 | Muller et al. | |
| 2015/0036566 A1* | 2/2015 | Blankenship ....... | H04W 52/281 370/311 |
| 2015/0223235 A1 | 8/2015 | Hwang et al. | |
| 2017/0223694 A1* | 8/2017 | Han ...................... | H04W 16/32 |

FOREIGN PATENT DOCUMENTS

| | | |
|---|---|---|
| CN | 102510577 | 6/2012 |
| CN | 102656831 | 9/2012 |
| KR | 10-2006-0040237 | 5/2006 |
| KR | 10-2008-0102148 | 11/2008 |
| KR | 10-2011-0048226 | 5/2011 |
| WO | 2011/162568 | 12/2011 |

OTHER PUBLICATIONS

U.S. Appl. No. 14/427,557, Office Action dated Nov. 29, 2017, 11 pages.
U.S. Appl. No. 14/427,557, Final Office Action dated Jun. 12, 2017, 12 pages.
U.S. Appl. No. 14/427,557, Office Action dated Jan. 27, 2017, 18 pages.
State Intellectual Property Office of the People's Republic of China Application Serial No. 201380050593.6, Office Action dated Sep. 20, 2017, 6 pages.
Fujitsu, "Discussion on simultaneous transmissions of PRACH and PUCCH/PUSCH/SRS", 3GPP TSG RAN WG1 Meeting #68, R1-120754, Feb. 2012, 4 pages.
Catt, "Concurrent transmission of uplink signals on PUSCH in Rel-10", 3GPP TSG RAN WG1 Meeting #64, R1-110706, Feb. 2011, 6 pages.
PCT International Application No. PCT/KR2013/007025, Written Opinion of the International Searching Authority dated Nov. 27, 2013, 1 page.

\* cited by examiner ature of the invention # UPLINK TRANSMISSION METHOD AND UPLINK TRANSMISSION DEVICE

CROSS-REFERENCE TO RELATED APPLICATIONS

This application is a continuation of U.S. patent application Ser. No. 14/427,557, filed on Mar. 11, 2015, now U.S. Pat. No. 10,194,423, which is the National Stage filing under 35 U.S.C. 371 of International Application No. PCT/KR2013/007025, filed on Aug. 5, 2013, which claims the benefit of U.S. Provisional Application No. 61/706,785, filed on Sep. 28, 2012, the contents of which are all hereby incorporated by reference herein in their entirety.

BACKGROUND OF THE INVENTION

Field of the Invention

The present invention relates to wireless communication and, more particularly, to an uplink transmission method and apparatus in a wireless communication system.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels are used in transmission of various uplink control information such as a hybrid automatic repeat request (HARQ) ACK/NACK, channel state information (CSI), and a scheduling request (SR).

Radio resources for the uplink channels are more limited than radio resources for the downlink channels, a transmission error of the uplink control information may degrade service quality, and as a result, the design of the uplink channels needs to consider the transmission error.

SUMMARY OF THE INVENTION

An object of the disclosure of this specification is to send an uplink channel more efficiently.

In order to achieve the above object, in accordance with the disclosure of this specification, there is provided an uplink transmission method performed by user equipment in a multi-cell environment in which a single uplink resource is shared. The method may comprise: receiving control information that configures an uplink control channel and an uplink shared channel so that the uplink control channel and the uplink shared channel are not simultaneously transmitted on the same one uplink subframe, wherein the single uplink resource is shared by a first cell and a second cell; selecting any one of the uplink control channel and the uplink shared channel if a first Scheduling Request (SR) for the first cell and Uplink Control Information (UCI) for the second cell are requested to be simultaneously transmitted on the same subframe through the uplink control channel and the uplink shared channel, respectively; sending the selected channel on the uplink subframe.

The method may further comprise: sending a second SR for the second cell. The second SR may be transmitted through uplink resources different from resources of the first SR. Here, the uplink resource through which the second SR is transmitted may have an index of an uplink control channel different from an index of an uplink control channel of the first SR or has a different location of a Resource Block (RB).

The method may further comprise: sending a second SR for the second cell on another uplink subframe. Here, each of the first and the second SRs may comprise information about a corresponding cell.

The method may further comprise: receiving control information that configures the second SR for the second cell so that the second SR is transmitted on another uplink subframe.

The first scheduling request may be transmitted on a subframe having an odd-numbered index, and the second SR may be transmitted on a subframe having an even-numbered index.

The method may further comprise: receiving a first uplink grant for the first SR from the first cell; and receiving a second uplink grant for the second SR from the second cell. The first uplink grant and the second uplink grant are received on different subframes.

The method may further comprise: performing the transmission of the uplink shared channel for the first cell. Hopping of radio resources for the uplink shared channel is differently set in the first cell and the second cell.

In selecting any one of the uplink control channel and the uplink shared channel, any one channel may be selected based on one or more of a type of the UCI and a container. Here, a priority may be determined based on any one of the type of the UCI and the container.

In order to achieve the above object, in accordance with the disclosure of this specification, there is provide a user equipment performing uplink transmission in a multi-cell environment in which a single uplink resource is shared. The user equipment may comprise: an RF unit which receives control information that configures an uplink control channel and an uplink shared channel so that the uplink control channel and the uplink shared channel are not simultaneously transmitted on the same one uplink subframe, wherein the single uplink resource is shared by a first cell and a second cell; and a processor which selects any one of the uplink control channel and the uplink shared channel if a first Scheduling Request (SR) for the first cell and Uplink Control Information (UCI) for the second cell are requested to be simultaneously transmitted on the same subframe through the uplink control channel and the uplink shared channel, respectively. Also, the RF unit is further configured to transmit the channel selected by the processor on the uplink subframe.

In accordance with the disclosure of this specification, uplink resources can be efficiently used because a plurality of cells shares a single uplink resource in a condition in which uplink resources are insufficient.

DESCRIPTION OF EXEMPLARY EMBODIMENTS

Figure 1:
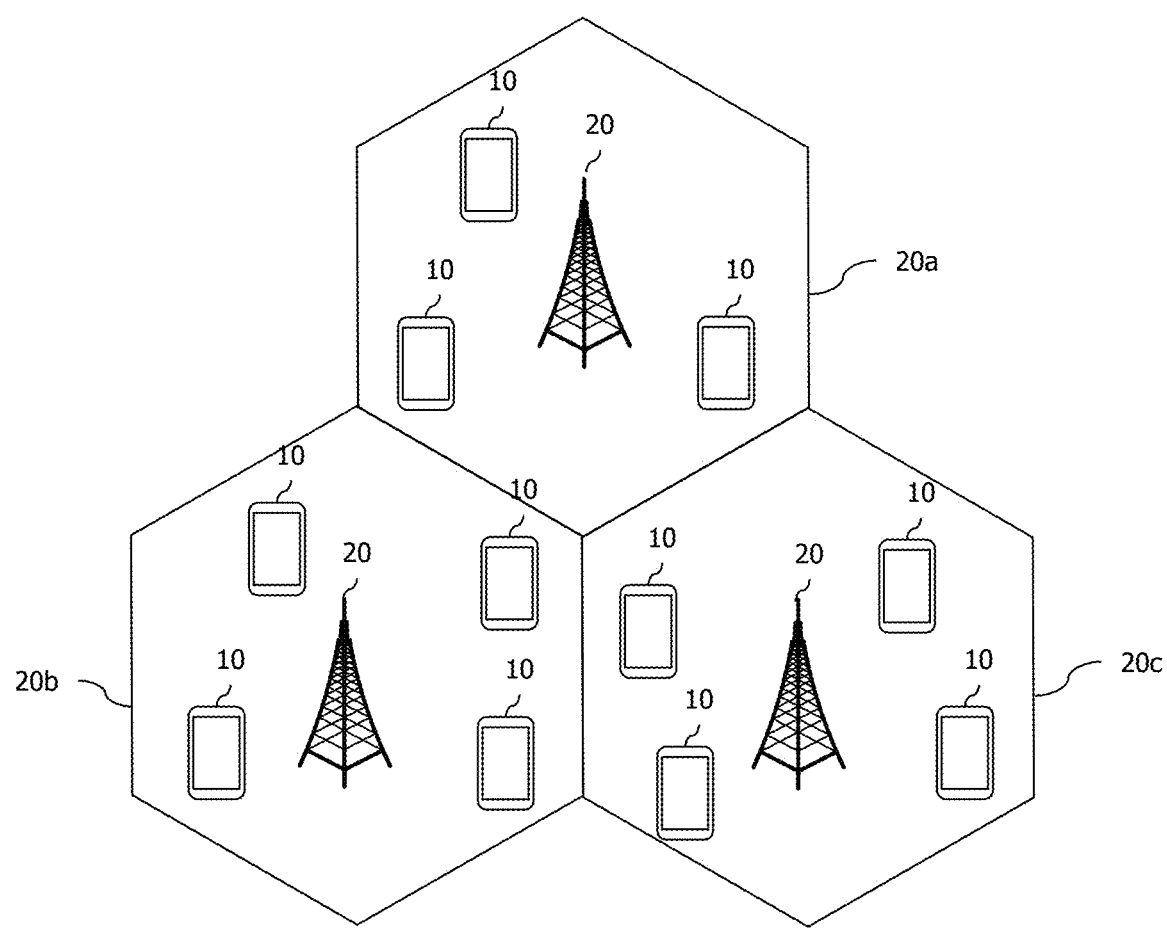
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

The wireless device may be served by a plurality of serving cells. Each serving cell may be defined as a downlink (DL) component carrier (CC) or a pair of the DL CC and an uplink (UP) CC.

The serving cell may be divided into a primary cell and a secondary cell. The primary cell is a cell which operates at a primary frequency, and performs an initial connection establishment process, starts a connection reestablishment process, or is designated as the primary cell during a handover process. The primary cell is also referred to as a reference cell. The secondary cell operates at a secondary frequency, may be set after an RRC (Radio Resource Control) connection is established, and may be used to provide an additional radio resource. At least one primary cell may be continuously set, and the secondary cell may be add/modified/cancelled by higher layer signaling (e.g., an RRC message).

A cell index (CI) of the primary cell may be fixed. For example, a lowest CI may be designated as the CI of the primary cell. Hereinafter, the CI of the primary cell is 0, and CIs of the secondary cell are sequentially allocated from 1.

FIG. 1 shows a wireless communication system.

The wireless communication system includes at least one base station (BS) 20. Respective BSs 20 provide a communication service to particular geographical areas 20a, 20b, and 20c (which are generally called cells). Each cell may be divided into a plurality of areas (which are called sectors). User equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 20 generally refers to a fixed station that communicates with the UE 10 and may be called by other names such as evolved-NodeB (eNB), base transceiver system (BTS), access point (AP), etc.

The terminal generally belongs to one cell and the cell to which the terminal belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
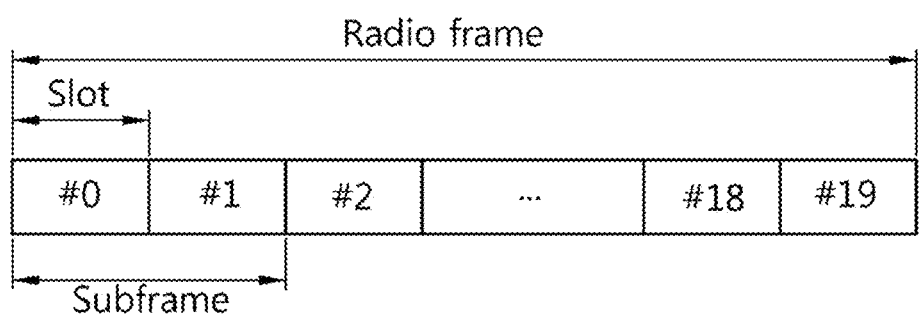
FIG. 2 illustrates the architecture of a radio frame according to FDD in 3GPP LTE.

FIG. 2 shows a downlink radio frame structure according to FDD of 3rd generation partnership project (3GPP) long term evolution (LTE).

The section 5 of 3GPP TS 36.211 V8.2.0 (2008 March) "Evolved Universal Terrestrial Radio Access (E-UTRA); Physical Channels and Modulation (Release 8)" may be incorporated herein.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Although it is described that one slot includes plural OFDM symbols for example, the number of OFDM symbols included in one slot may vary depending on a length of a cyclic prefix (CP).

Figure 3:
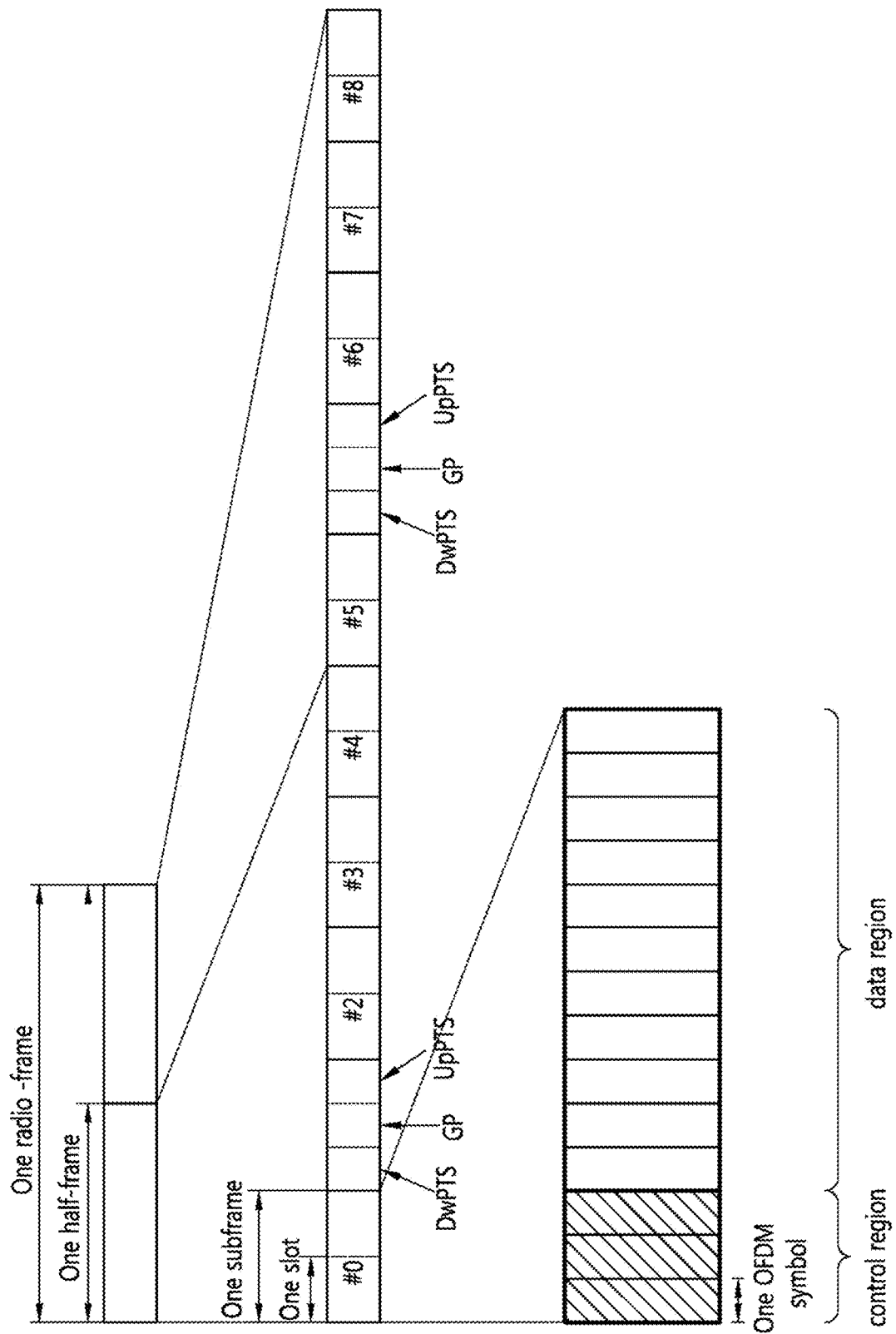
FIG. 3 illustrates the architecture of a downlink radio frame according to TDD in 3GPP LTE.

FIG. 3 illustrates the architecture of a downlink radio frame according to TDD in 3GPP LTE.

For this, 3GPP TS 36.211 V8.7.0 (2009 May) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, 01-DM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven 01-DM symbols, and in the extended CP, includes six 01-DM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
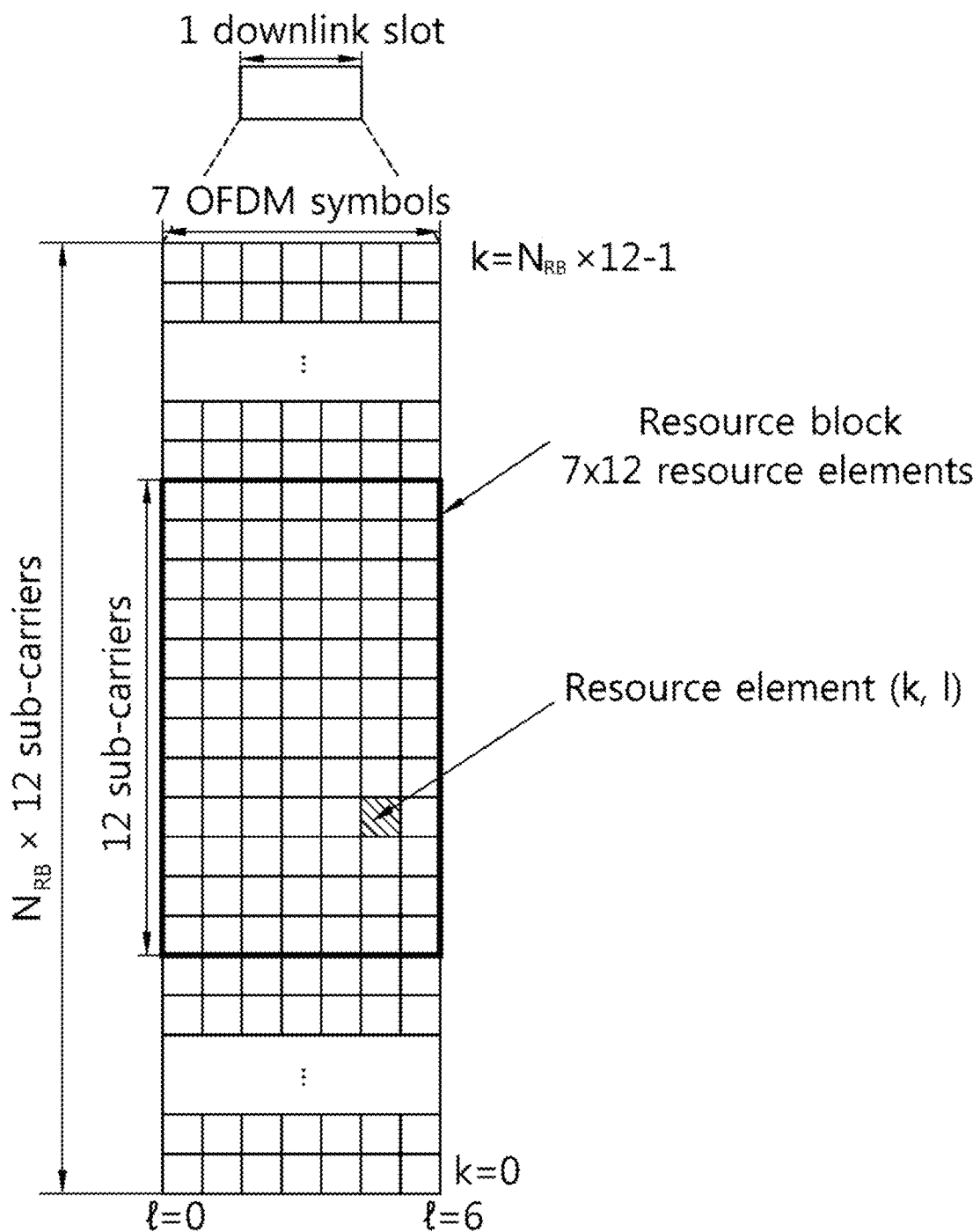
FIG. 4 is an exemplary diagram illustrating a resource grid for a single uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
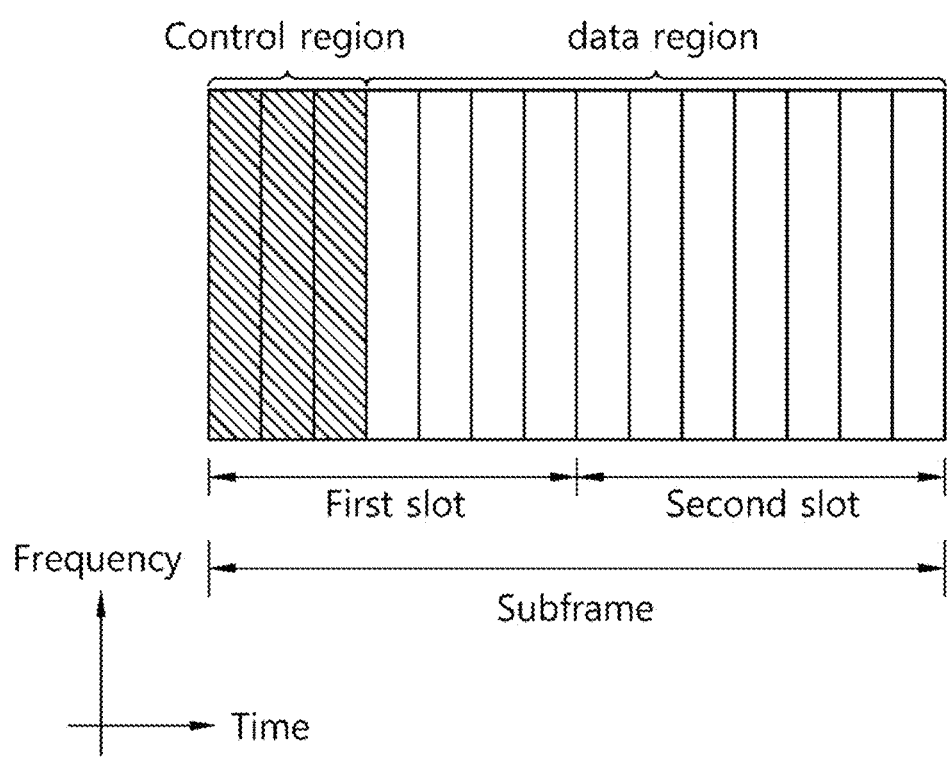
FIG. 5 illustrates the structure of a downlink subframe.

FIG. 5 illustrates the architecture of a downlink sub-frame.

For this, 3GPP TS 36.211 V10.4.0 (2011 December) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six O1-DM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
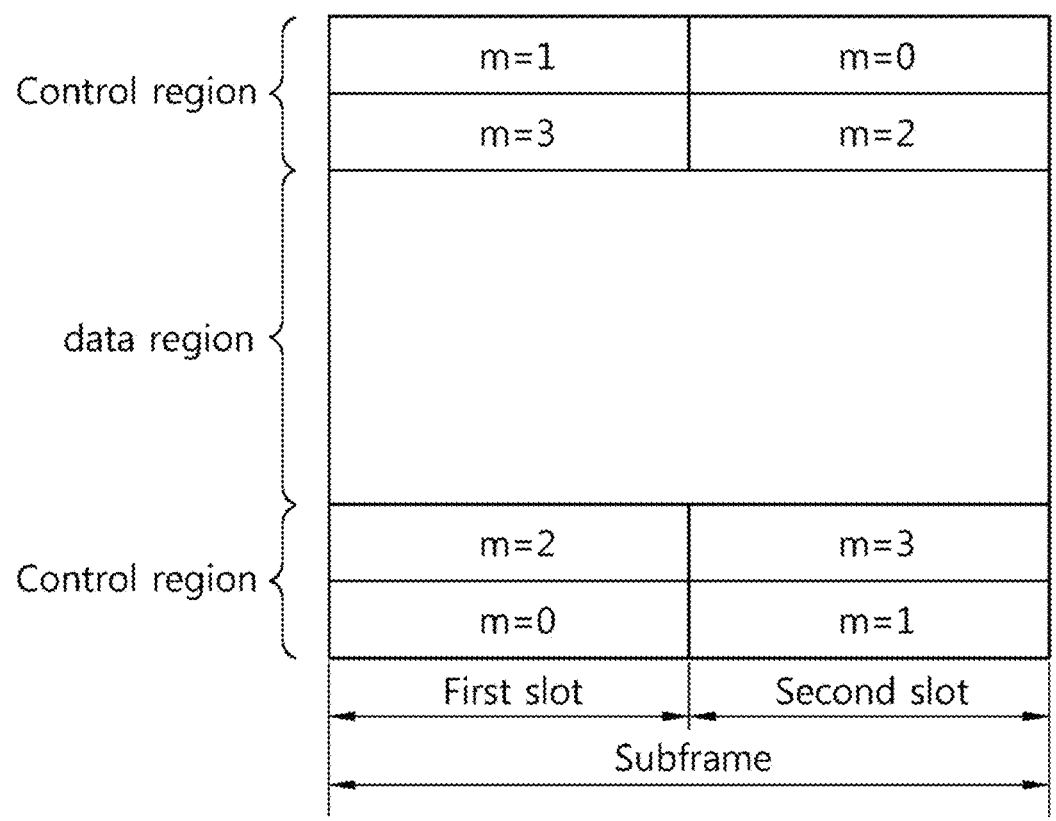
FIG. 6 illustrates the structure of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
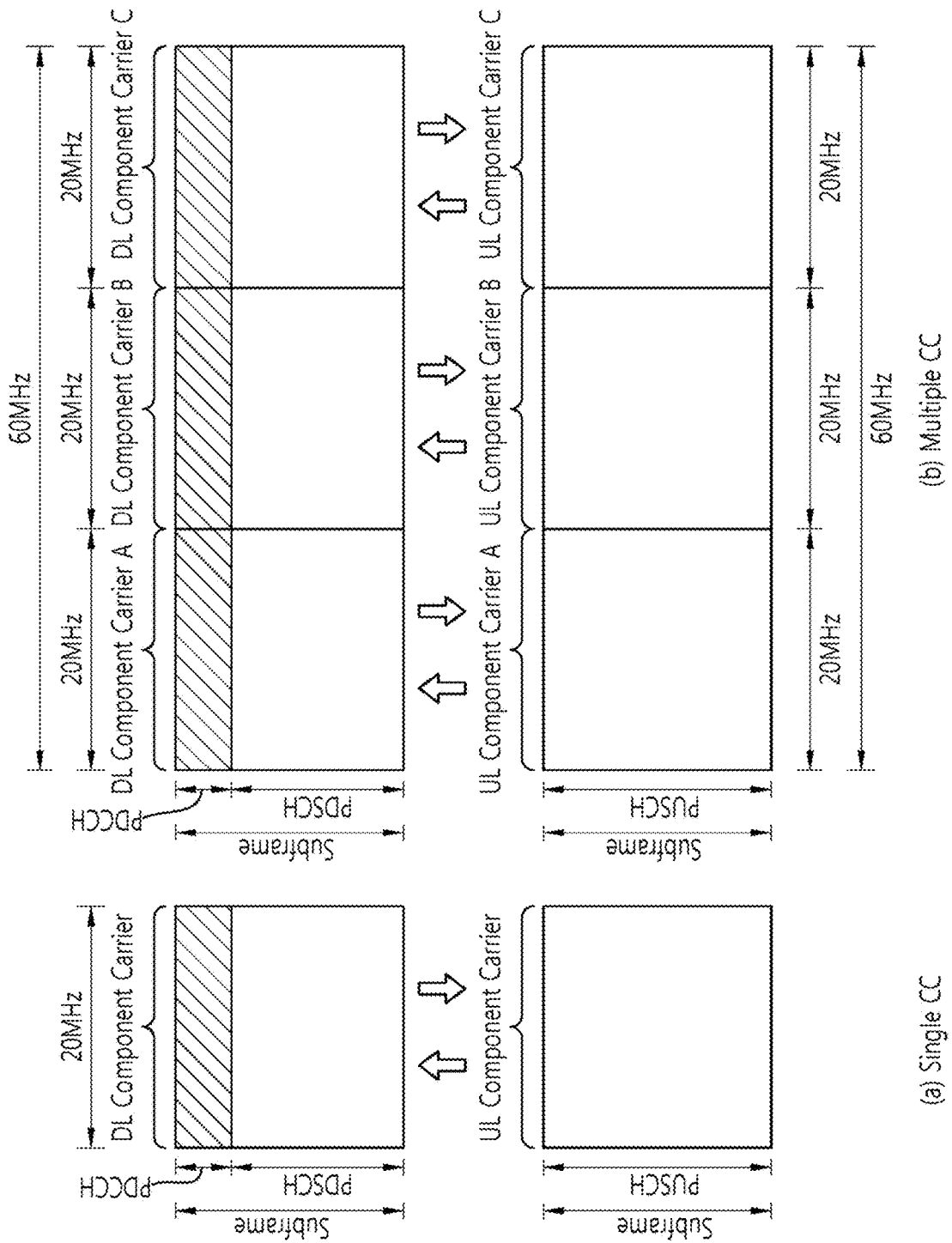
FIG. 7 is an example of a comparison between the existing single carrier system and a carrier aggregation system.

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
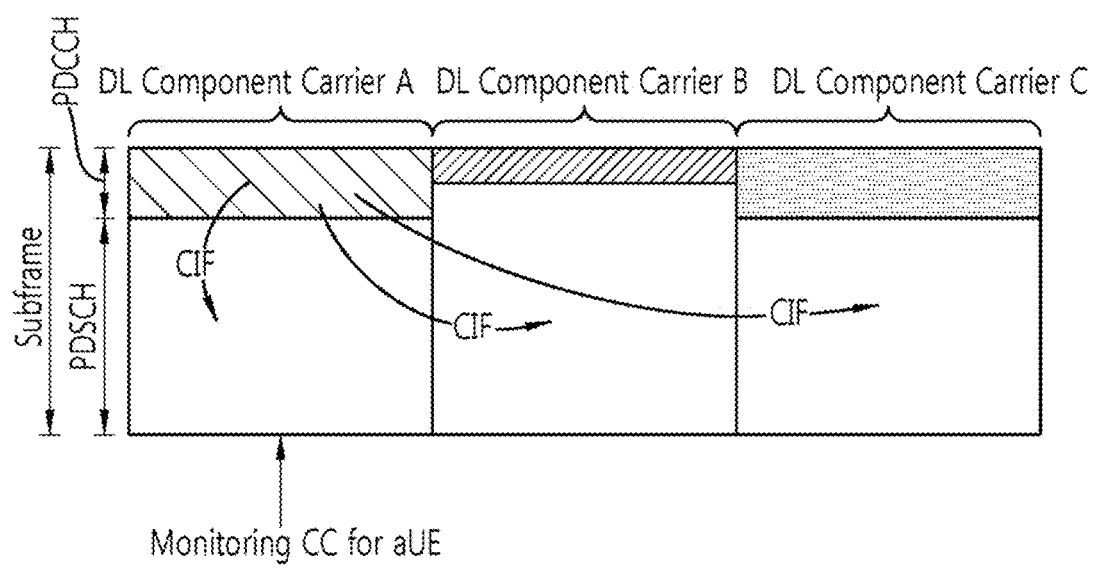
FIG. 8 illustrates cross carrier scheduling in a carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 9:
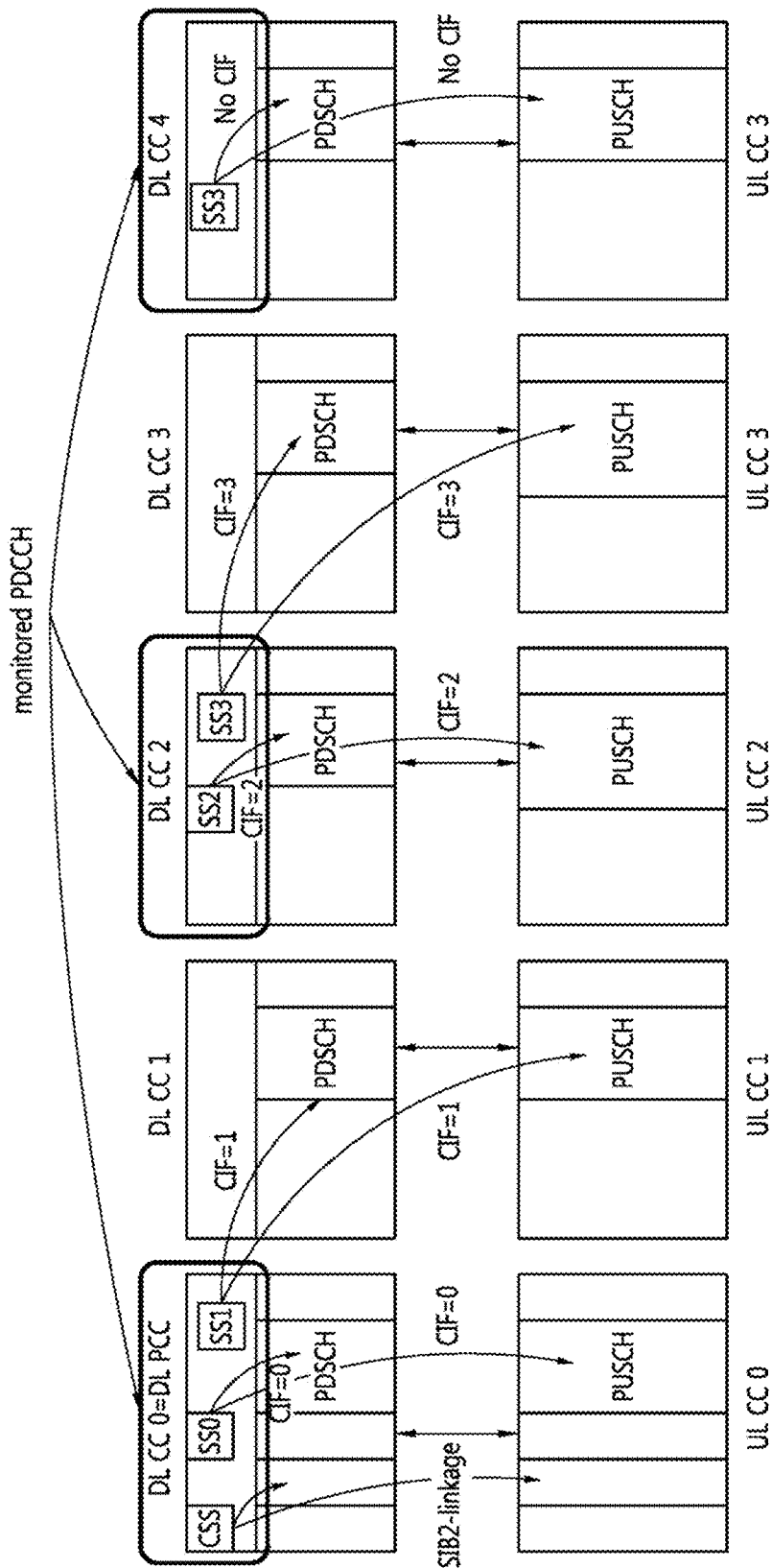
FIG. 9 illustrates an example of scheduling when cross carrier scheduling is configured in a carrier aggregation system.

FIG. 9 illustrates an example of scheduling performed when cross-carrier scheduling is configured in a cross-carrier scheduling.

Referring to FIG. 9, DL CC 0, DL CC 2, and DL CC 4 belong to a PDCCH monitoring DL CC set. The user equipment searches for DL grants/UL grants for DL CC 0 and UL CC 0 (UL CC linked to DL CC 0 via SIB 2) in the CSS of DL CC 0. The user equipment searches for DL grants/UL grants for DL CC 1 and UL CC 1 in SS 1 of DL CC 0. SS 1 is an example of USS. That is, SS 1 of DL CC 0 is a space for searching for a DL grant/UL grant performing cross-carrier scheduling.

Figure 10:
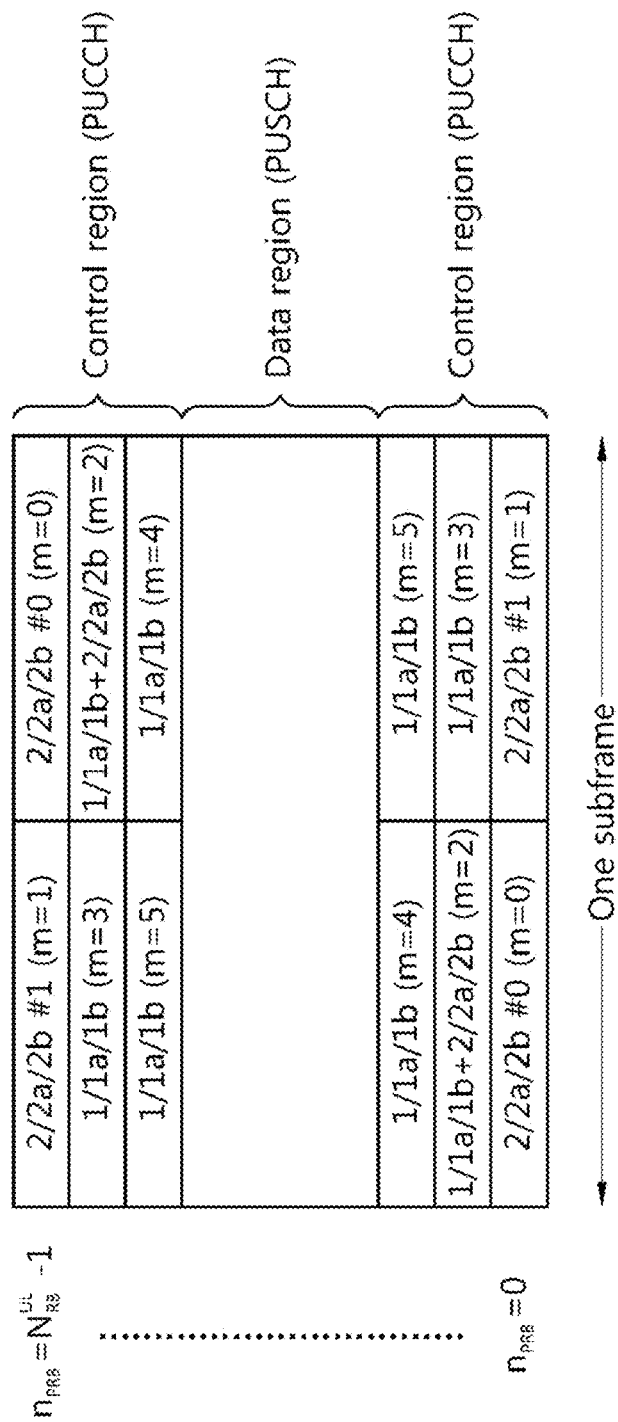
FIG. 10 illustrates PUCCHs and a PUSCH in an uplink subframe.

FIG. 10 illustrates a PUCCH and a PUSCH on an uplink subframe.

PUCCH formats will be described with reference to FIG. 10.

Uplink control information (UCI) may be transmitted to the PUCCH. In this case, the PUCCH transmits various types of control information according to a format. The UCI includes a HARQ ACK/NACK, a scheduling request (SR), and channel status information (CSI) representing a downlink channel status.

PUCCH format 1 transmits a scheduling request (SR). In this case, an on-off keying (OOK) scheme may be applied. PUCCH format 1a transmits an acknowledgement/non-acknowledgment (ACK/NACK) modulated by a binary phase shift keying (BPSK) scheme with respect to one codeword. PUCCH format 1b transmits an ACK/NACK modulated by a quadrature phase shift keying (QPSK) scheme with respect to two codewords. PUCCH format 2 transmits a channel quality indicator (CQI) modulated by the QPSK scheme. PUCCH formats 2a and 2b transport the CQI and the ACK/NACK.

Table 1 illustrates the PUCCH formats.

TABLE 2

| Format | Description |
|---|---|
| Format 1 | Scheduling request (SR) |
| Format 1a | ACK/NACK of 1 bit HARQ, Scheduling request (SR) may exist or not |
| Format 1b | ACK/NACK of 2 bit HARQ, Scheduling request (SR) may exist or not |
| Format 2 | CSI (20 code bits) |
| Format 2 | In the case of extended CP, CSI and HARQ ACK/NACK of 1 bit or 2 bits |
| Format 2a | CSI and HARQ ACK/NACK of 1 bit |
| Format 2b | CSI and HARQ ACK/NACK of 2 bits |
| Format 3 | A plurality of ACK/NACKs for carrier aggregation |

Each PUCCH format is mapped in the PUCCH to be transmitted. For example, the PUCCH formats 2/2a/2b are mapped in the resource block (m=0, 1 in FIG. 7) of a band edge allocated to the UE to be transmitted. A mixed PUCCH resource block (RB) may be mapped in a resource block (for example, m=2) adjacent to the resource block to which the PUCCH formats 2/2a/2b are allocated in a central direction of the band to be transmitted. The PUCCH formats 1/1a/1b to which the SR and the ACK/NACK are transmitted may be disposed in a resource block of m=4 or m=5. The number N(2)RB of resource blocks which may be used in the PUCCH formats 2/2a/2b to which the CQI is transmitted may be indicated to the UE through a broadcasted signal.

The aforementioned CSI is an index representing a status of the DL channel, and may include at least one of a channel quality indicator (CQI) and a precoding matrix indicator (PMI). Further, a precoding type indicator (PTI), a rank indication (RI), and the like may be included.

The CQI provides information on link adaptive parameters which may be supported by the UE for a predetermined time. The CQI may indicate a data rate which may be supported by the DL channel by considering a characteristic of the UE receiver, a signal to interference plus noise ratio (SINR), and the like. The base station may determine modulation (QPSK, 16-QAM, 64-QAM, and the like) to be applied to the DL channel and a coding rate by using the CQI. The CQI may be generated by various methods. For example, the various methods include a method of quantizing and feed-backing the channel status as it is, a method of calculating and feed-backing a signal to interference plus noise ratio (SINR), a method of notifying a status which is actually applied to the channel such as a modulation coding scheme (MCS), and the like. When the CQI is generated based on the MCS, the MCS includes a modulation scheme, a coding scheme, and a coding rate according to the coding scheme, and the like.

The PMI provides information on a precoding matrix in precoding based on a code book. The PMI is associated with the multiple input multiple output (MIMO). The feed-backing of the PMI in the MIMO may be called a closed loop MIMO.

The RI is information on the number of layers recommended by the UE. That is, the RI represents the number of independent streams used in spatial multiplexing. The RI is fed-back only in the case where the UE operates in an MIMO mode using the spatial multiplexing. The RI is always associated with one or more CQI feed-backs. That is, the fed-back CQI is calculated by assuming a predetermined RI value. Since the rank of the channel is generally changed slower than the CQI, the RI is fed-back less than the number of CQIs. A transmission period of the RI may be a multiple of the CQI/PMI transmission period. The RI is defined in the entire system band, and a frequency-selective RI feedback is not supported.

As such, the PUCCH is used only in the transmission of the UCI. To this end, the PUCCH support multiple formats. A PUCCH having different bit numbers for each subframe may be used according to a modulation scheme subordinate to the PUCCH format.

Meanwhile, the illustrated PUSCH is mapped in an uplink shared channel (UL-SCH) which is a transmission channel Uplink data transmitted on the PUSCH may be a transmission block which is a data block for the UL-SCH transmitted during the TTI. The transmission block may include user data. Alternatively, the uplink data may be multiplexed data. The multiplexed data may be acquired by multiplexing the transmission block for the UL-SCH and the channel status information. For example, the channel status information (CSI) multiplexed in the data may include the CQI, the PMI, the RI, and the like. Alternatively, the uplink data may be constituted by only the uplink status information. Periodic or aperiodic channel status information may be transmitted through the PUSCH.

The PUSCH is allocated by the UL grant on the PDCCH. Although not illustrated, a fourth OFDM symbol of each slot of the normal CP is used in the transmission of a demodulation reference signal (DM RS) for the PUSCH.

Hereinafter, the periodic transmission of CSI is described.

Figure 11:
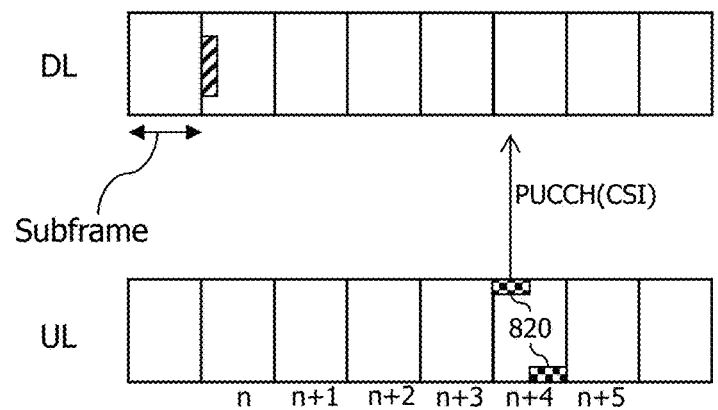
FIG. 11 illustrates an example of a periodic CSI report in 3GPP LTE.

FIG. 11 illustrates an example of a periodic CSI report in 3GPP LTE.

As shown in FIG. 11, the CSI may be transmitted through the PUCCH periodically according to a period determined in the upper layer. That is, the periodic channel status information (CSI) may be transmitted through the PUCCH.

The UE may be semi-statically configured by an upper layer signal so as to periodically feed-back a differential CSI (CQI, PMI, RI) through the PUCCH. In this case, the UE transmits the corresponding CSI according to modes defined as shown in a table given below.

TABLE 3

| | | PMI feed-back time | |
|---|---|---|---|
| | | No PMI | Single PMI |
| PUCCH CQI feed-back type | Wideband CQI | Mode 1-0 | Mode 2-0 |
| | Selective subband CQI | Mode 2-0 | Mode 2-1 |

A periodic CSI reporting mode in the PUCCH described below is supported for each of the aforementioned transmission modes.

TABLE 4

| Transmission mode (transmission mode) | PUCCH CSI reporting modes |
|---|---|
| Transmission mode 1 | Modes 1-0, 2-0 |
| Transmission mode 2 | Modes 1-0, 2-0 |
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | When PMI/RI reporting is configured to UE in modes 1-1 and 2-1; When PMI/RI reporting is not configured to UE in modes 1-0 and 2-0 |
| transmission mode 9 | When PMI/RI reporting is configured to UE in modes 1-1 and 2-1 and the number of CSI-RS ports is larger than 1. When PMI/RI reporting is not configured to UE in modes 1-0 and 2-0 or the number of CSI-RS ports is 1 |

Meanwhile, a collision of the CSI report means a case in which a subframe configured to transmit a first CSI and a subframe configured to transmit a second CSI are the same as each other. When the collision of the CSI report occurs, the first CSI and the second CSI are simultaneously transmitted, or the transmission of a CSI having a low priority is discarded (alternatively, referred to as abandon or drop), and a CSI having a high priority may be transmitted, according to priorities of the first CSI and the second CSI.

The CSI report through the PUCCH may include various report types according to a transmission combination of the CQI, the PMI, and the RI, and a period and an offset value divided according to each report type (hereinafter, abbreviated as a type) are supported.

Type 1: Supports CQI feedback for a subband selected by the UE.

Type 1a: Supports subband CQI and second PMI feedback.

Types 2, 2b, and 2c: Supports wideband CQI and PMI feedback.

Type 2a: Supports wideband PMI feedback.

Type 3: Supports RI feedback.

Type 4: Transmits the wideband CQI.

Type 5: Supports RI and wideband PMI feedback.

Type 6: Supports RI and PTI feedback.

Hereinafter, the aperiodic transmission of CSI is described.

Figure 12:
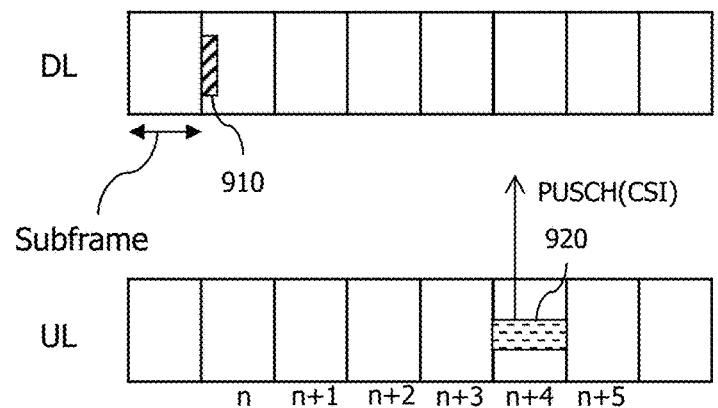
FIG. 12 illustrates an example of an aperiodic CSI report in 3GPP LTE.

FIG. 12 illustrates an example of an aperiodic CSI report in 3GPP LTE.

A control signal that requests the transmission of CSI, that is, an aperiodic CSI request signal, may be included in the scheduling control signal of a PUSCH transmitted in a PDCCH 910, that is, an UL grant. In this case, UE aperiodically reports CSI through a PUSCH 920. As described above, the transmission of CSI on a PUSCH is called an aperiodic CSI report in that it is triggered in response to a request from a BS. The CSI report may be triggered by an UL grant or a random access response grant.

More specifically, a wireless device receives an UL grant, including information about the scheduling of the PUSCH, through the PDCCH 910 in a subframe n. The UL grant may include a CQI request field. The following table illustrates an example of a CQI request field of 2 bits. The value or number of bits of the CQI request field is only an example.

TABLE 5

| Value of CQI request field | Contents |
| --- | --- |
| 00 | A CSI report is not triggered |
| 01 | A CSI report on a serving cell is triggered |
| 10 | A CSI report on a first set of serving cells is triggered |
| 11 | A CSI report on a second set of serving cells is triggered |

A BS may previously notify a wireless device of information about the first and the second sets whose CSI reports are triggered.

When a CSI report is triggered, the wireless device sends CSI on the PUSCH 920 in a subframe n+k. In this case, k=4, but is only an example.

A BS may previously designate report node for CSI to a wireless device.

The following table illustrates an example of CSI report modes in 3GPP LTE.

TABLE 6

|  | PMI feedback type | | |
| --- | --- | --- | --- |
|  | No PMI | Single PMI | Multiple PMI |
| Wideband CQI |  |  | Mode 1-2 |
| Selective subband CQI | Mode 2-0 |  | Mode 2-2 |
| Set subband CQI | Mode 3-0 | Mode 3-1 |  |

(1) Mode 1-2 (Mode 1-2)

A precoding matrix is selected on the assumption that DL data is transmitted only through a corresponding subband with respect to each subband. A wireless device generates a CQI (called a wideband CQI) by assuming the selected precoding matrix with respect to a band (called a band set S) designated by a system band or a high layer signal.

The wireless device sends CSI including the wideband CQI and the PMI of each subband. In this case, the size of each subband may be different depending on the size of a system band.

(2) Mode 2-0

A wireless device selects preferred M subbands with respect to a band (band set S) designated by a system band or a high layer signal. The wireless device generates a subband CQI by assuming that data has been transmitted in the selected M subbands. The wireless device additionally generates a single wideband CQI with respect to the system band or the band set S.

The wireless device sends CSI, including information about the selected M subbands, the subband CQI, and the wideband CQI.

(3) Mode 2-2

A wireless device selects M preferred subbands and a single precoding matrix for the M preferred subbands on the assumption that DL data is transmitted through the M preferred subbands.

Subband CSI for the M preferred subbands is defined in each codeword. In addition, the wireless device generates a wideband CQI for a system band or a band set S.

The wireless device sends CSI, including the M preferred subbands, a single subband CQI, and a PMI, wideband PMI, and wideband CQI for the M preferred subbands.

(4) Mode 3-0

A wireless device sends CSI, including a wideband CQI and a subband CQI for configured subbands.

(5) Mode 3-1

A wireless device generates a single precoding matrix for a system band or a band set S. The wireless device generates a subband CQI for each codeword by assuming the generated single precoding matrix. The wireless device may generate a wideband CQI by assuming the single precoding matrix.

The simultaneous transmission of a PUCCH and a PUSCH is described below.

In 3GPP Release 8 or Release 9 systems, UE is not allowed to simultaneously send a PUCCH and a PUSCH on a single carrier in order to maintain single carrier characteristics when using the SC-FDMA method for uplink transmission.

In 3GPP Release 10 systems, however, whether a PUCCH and a PUSCH are simultaneously transmitted may be indicated by a higher layer. That is, UE may simultaneously send a PUCCH and a PUSCH or may send only one of a PUCCH and a PUSCH in response to an instruction from a higher layer.

Figure 13:
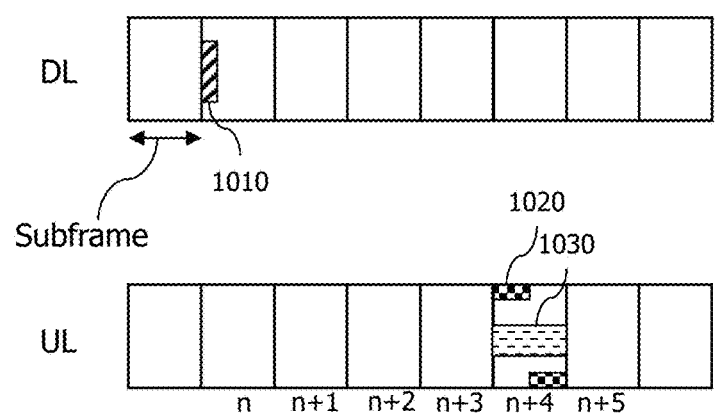
FIG. 13 illustrates an example of the simultaneous transmission of a PUCCH and a PUSCH.

FIG. 13 illustrates an example of the simultaneous transmission of a PUCCH and a PUSCH.

As may be seen with reference to FIG. 13, UE receives a PDCCH 1010 in a subframe n.

Furthermore, the UE may simultaneously send a PUCCH 1020 and a PUSCH 1030 in a subframe n+4, for example.

The simultaneous transmission of the PUCCH and the PUSCH is defined as follows in a 3GPP Release 10 system.

It is assumed that UE has been configured for only a single serving cell and configured to not simultaneously send a PUSCH and a PUCCH. In this case, if the UE does not send a PUSCH, UCI may be transmitted according to the PUCCH formats 1/1a/1b/3. If the UE sends a PUSCH, but the PUSCH does not correspond to a random access response grant, UCI may be transmitted through the PUSCH.

Unlike in the above, it is assumed that UE has been configured for only a single serving cell and configured to not simultaneously send a PUSCH and a PUCCH. In this case, if UCI includes only HARQ-ACK and an SR, UCI may be transmitted through a PUCCH according to the PUCCH formats 1/1a/1b/3. If UCI includes only periodic CSI, however, the UCI may be transmitted on a PUCCH according to the PUCCH format 2. Alternatively, if UCI includes periodic CSI and HARQ-ACK and the UE does not send a PUSCH, the UCI may be transmitted through a PUCCH according to the PUCCH formats 2/2a/2b. Alternatively, if UCI includes only HARQ-ACK/NACK or UCI includes HARQ-ACK/NACK and an SR, UCI includes an affirmative SR and periodic/aperiodic CSI, or UCI includes only aperiodic CSI, the HARQ-ACK/NACK, the SR, and the affirmative SR may be transmitted through a PUCCH, and the periodic/aperiodic CSI may be transmitted through a PUSCH.

Unlike in the above, it is assumed that UE has been configured for one or more serving cells and configured to not simultaneously send a PUSCH and a PUCCH. In this case, if the UE does not send a PUSCH, UCI may be transmitted through a PUCCH according to the PUCCH formats 1/1a/1b/3. If UCI includes aperiodic CSI or includes aperiodic UCI and HARQ-ACK, the UCI may be transmitted through the PUSCH of a serving cell. Alternatively, if UCI includes periodic CSI and HARQ-ACK/NACK and the UE does not send a PUSCH in the subframe n of a primary cell, the UCI may be transmitted through the PUSCH.

Unlike in the above, it is assumed that UE has been configured for one or more serving cells and configured to be able to simultaneously send a PUSCH and a PUCCH. In this case, if UCI includes one or more of HARQ-ACK and an SR, the UCI may be transmitted through a PUCCH according to the PUCCH formats 1/1a/1b/3. If UCI includes only periodic CSI, however, the UCI may be transmitted through a PUCCH using the PUCCH format 2. Alternatively, if UCI includes periodic CSI and HARQ-ACK/NACK and the UE does not send a PUSCH, CSI may be dropped (or abandoned) without being transmitted according to some conditions. Alternatively, if UCI is transmitted through HARQ-ACK/NACK and periodic CSI and the UE sends a PUSCH in the subframe of a primary cell, the HARQ-ACK/NACK may be transmitted through a PUCCH according to the PUCCH formats 1a/1b/3 and the periodic CSI may be transmitted through the PUSCH.

An HARQ in 3GPP LTE is described below.

3GPP LTE uses an synchronous HARQ in uplink transmission and uses an asynchronous HARQ in downlink transmission. The synchronous HARQ means that retransmission timing is fixed, and the asynchronous HARQ means that retransmission timing is not fixed. That is, the synchronous HARQ is initially transmitted and retransmitted in a cycle of an HARQ.

Figure 14:
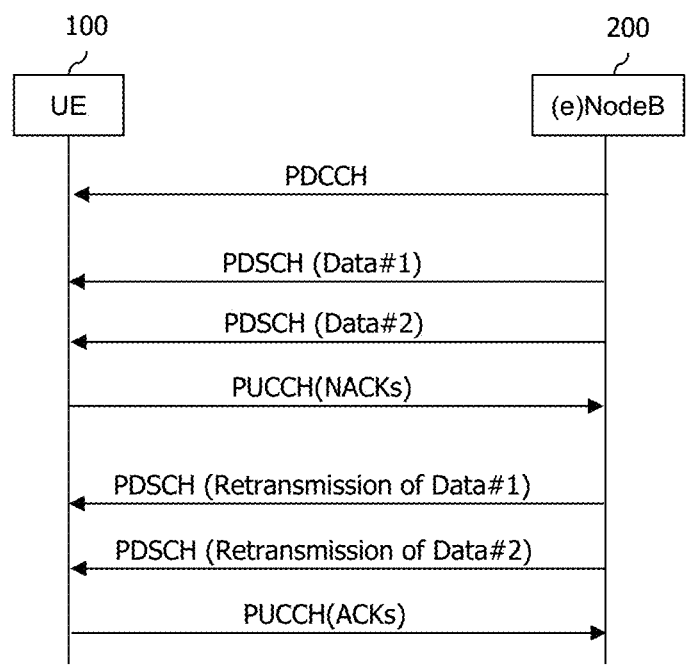
FIG. 14 is an exemplary diagram illustrating the operation of an HARQ between an eNodeB and UE.

FIG. 14 is an exemplary diagram illustrating the operation of an HARQ between an (e)NodeB and UE.

As illustrated in FIG. 14, in a prior art, an HARQ operation is performed in the MAC layer for efficient transmission of data, and a detailed HARQ operation process is as follows.

First, an (e)NodeB, that is, an eNodeB 200, sends scheduling information through a physical downlink control channel (PDCCH) in order to send data to UE, that is, UE 100, using an HARQ method.

The UE 100 checks incoming scheduling information by monitoring the control channel, that is, the PDCCH.

If information about the UE 100 is found to be present by checking the scheduling information, the UE 100 receives data (e.g., illustrated data #1 and data #2) from the eNodeB 200 through a common channel (a physical shared channel (PSCH)) at a point of time associated with the PDCCH.

When receiving the data, the UE 100 attempts the decoding of the data. The UE sends HARQ feedback to the eNodeB 200 based on a result of the decoding. That is, the UE 100 sends an ACK signal if it is successful in the decoding and sends an NACK signal to the eNodeB 200 through a PUCCH or PUSCH if it is unsuccessful in the decoding.

When receiving the ACK signal, the eNodeB 200 detects that the transmission of the data to the UE has been successful and sends next data.

If the eNodeB 200 receives the NACK signal, it detects that the transmission of the data to the UE 100 has been unsuccessful and retransmits the same data according to the same format or a new format at a proper point of time.

The UE 100 that has sent the NACK signal attempts the reception of the retransmitted data.

If the UE 100 receives the retransmitted data, it combines the retransmitted data and data stored in a buffer in the state in which the decoding of the data has been previously unsuccessful using various methods and attempts the decoding of the data. The UE 100 sends an ACK signal if it is successful in the decoding and sends an NACK signal to the eNodeB 200 through a PUCCH or PUSCH it is unsuccessful in the decoding. The UE 100 repeats a process of sending an NACK signal and receiving retransmitted data until it is successful in the decoding of data.

An HARQ in a downward direction, that is, in the direction from the eNodeB 200 to the UE 100, has been described so far.

However, an synchronous HARQ is used in an upward direction, that is, in the direction from the UE 100 to the eNodeB 200. In this case, the synchronous HARQ means that the time interval between the transmissions of data is the same. That is, if UE has to perform retransmission on any transmission after performing the transmission, the transmission is generated after a specific time from previous transmission. In this case, there are advantages in that the waste of radio resources occurring because scheduling information is transmitted using a PDCCH at each transmission point of time can be reduced and the danger of not performing proper transmission because UE does not properly receive a PDCCH can be reduced.

Figure 15:
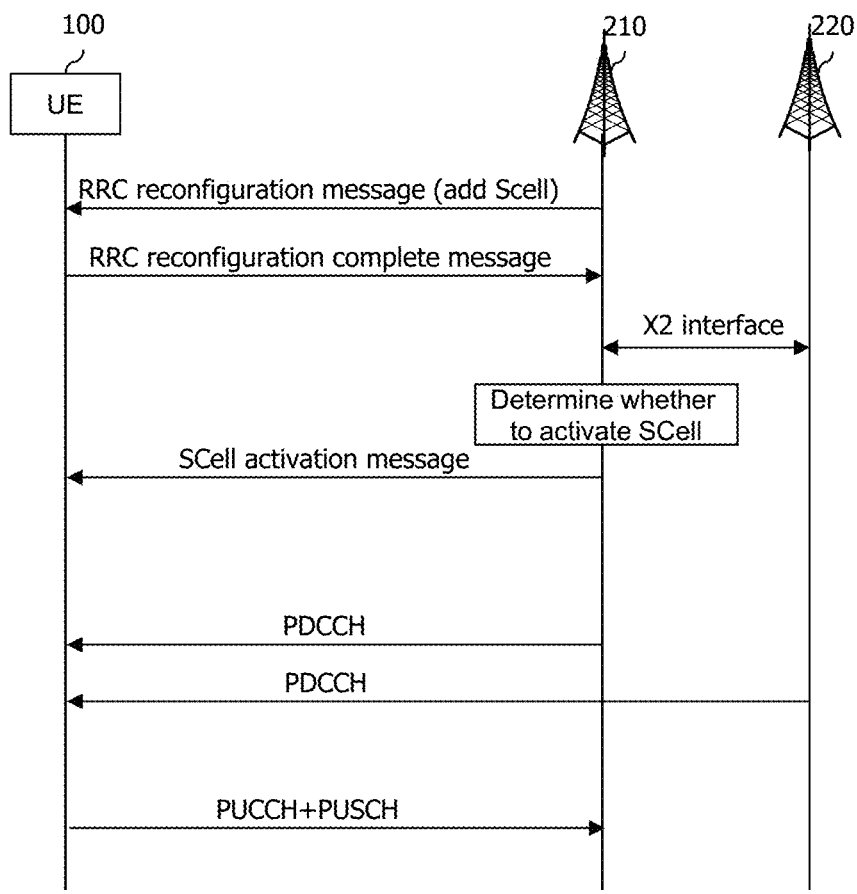
FIG. 15 is a flowchart illustrating a technical ambiguity that may occur when a primary cell and a secondary cell independently perform scheduling.

FIG. 15 is a flowchart illustrating a technical ambiguity that may occur when a primary cell and a secondary cell independently perform scheduling.

Referring to FIG. 15, a primary cell 210 sends an RRC reconfiguration message to UE, that is, UE 100. A secondary cell, that is, a SCell, may be added by the RRC reconfiguration message. In this case, the secondary cell may be for downlink. That is, the primary cell provides both uplink and downlink, but the secondary cell may provide only downlink.

In this case, the two cells may be intra-eNodeB types or inter-eNodeB types.

The UE 100 sends an RRC reconfiguration-complete message to the primary cell 210 in response to the RRC reconfiguration message.

The primary cell 210 determines whether or not to activate the added secondary cell 220, that is, the SCell. If the added secondary cell 220 needs to be activated, the primary cell 210 sends an activation message to the UE 100.

Meanwhile, if the two cells are inter-eNodeBs, each cell may independently scheduling on its downlink. Accordingly, each cell sends a PDCCH including scheduling information and then sends a PDSCH, including downlink data, to the UE 100.

In accordance with the scheduling information, the transmission of a PUCCH to the primary cell 210 may be required, and the transmission of a PUSCH to the secondary cell 220 may be required. In this case, however, if the UE 100 has not been configured to simultaneously send a PUCCH and a PUSCH, a problem may occur.

Furthermore, as described above, the number of uplink Component Carriers (CCs) may not be secured compared to the number of cells (or the number of eNodeBs) for the efficient management of carriers or due a condition in which available carriers are limited. Furthermore, if cells geographically correspond to different eNodeBs in such a manner that carriers are aggregated like an inter-eNodeB form, a method of sending important uplink information, such as aperiodic CSI corresponding to each cell, needs to be taken into consideration.

Meanwhile, a method of sending UL information needs to be taken into consideration in a condition in which UL CCs available in the same time are limited due to the limit of UL CCs supportable by UE and implementation issues even in a condition in which UL CCs have been sufficiently secured.

Accordingly, solutions for improvements are described below.

In order to reduce the above problem, a method in which a plurality of cells allocates several uplink channels in a single uplink CC may be taking into consideration. This may be enabled or disabled through a higher layer signal. The several uplink channels may include a PUSCH including as an UL-SCH, a PUSCH including aperiodic CSI, an SRS, a PRACH, etc. In the case of the PUCCH, coordination may be performed between several cells in response to a downlink grant. Furthermore, the PUSCH including an UL-SCH may include a PUSCH (i.e., msg3) corresponding to the grant of a random access response. The PUSCH may include a piggyback form of HARQ-ACK and periodic CSI. A scheme for allocating uplink channels on the single uplink CC may be performed using an uplink grant.

However, when a problem is to be solved using an uplink grant as described above, if information about mutual scheduling is not shared between two cells or great delay is generated although pieces of the information are exchanged, uplink grants for the cells may collide against each other.

Accordingly, a scheme for reducing the problem and UE procedures when a collision occurs are described below.

Figure 16:
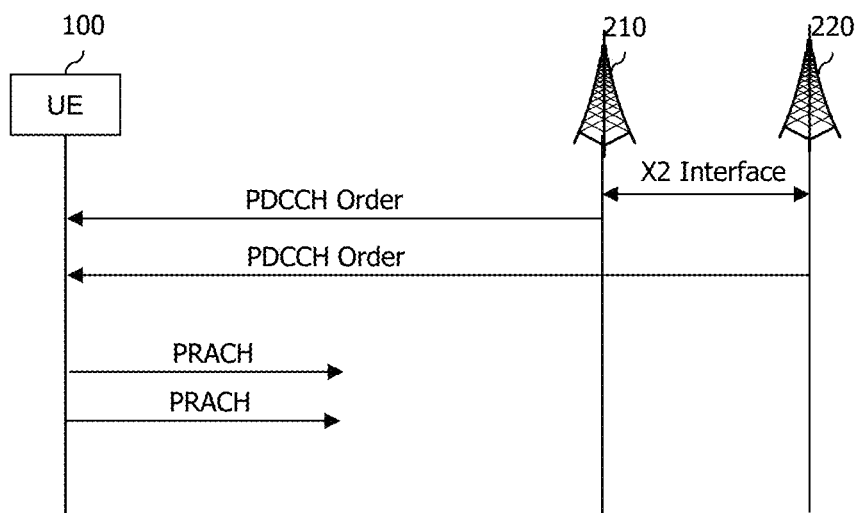
FIG. 16 illustrates procedures regarding a PRACH in a multi-cell environment.

FIG. 16 illustrates procedures regarding a PRACH in a multi-cell environment.

As may be seen with reference to FIG. 16, if the primary cell 210 and the secondary cell 220 correspond to eNodeBs geographically spaced apart from each other, as in an inter-site CA, independent timing adjustments are required for each cell or cell group that share a single uplink CC. In particular, as illustrated, PRACH transmission for each cell or cell group needs to be taken into consideration. Furthermore, as illustrated, a collision may occur between PRACHs to be transmitted from the UE to respective cells because PDDCH order corresponding to the PRACHs in each cell or cell group may be independently scheduled. Accordingly, UE requires a scheme or procedure for solving a collision between cells.

In a first scheme, subframe indices in which PDCCH order are to be transmitted may be configured to not overlap with each other between cells or transmission information may be shared through an X2 interface. In this case, a search space in which the UE 100 detects a PDCCH may be restricted based on resources in which a PDCCH for each cell or cell group is transmitted. Accordingly, the number of blind decodings in the UE can be reduced.

IN a second scheme, subframe indices in which a PRACH for each cell or cell group is to be transmitted may be configured to not overlap with each other for each cell or cell group or transmission information may be shared through an X2 interface. The location where PDCCH order is to be transmitted may be designated based on the subframe indices.

In a third scheme, methods of sending a PRACH for each cell or cell group may be configured to not overlap with each other for each cell or cell group or transmission information may be shared through an X2 interface. In this case, the method of sending a PRACH may be achieved by a combination of a PRACH configuration, a preamble index, a resource location, etc. Furthermore, UE may be notified of some of or the entire information through the PDCCH order. In this case, if the PRACH configuration and the resource location are identical with parameters designated by a primary cell, the UE may not be additionally notified of the PRACH configuration and the resource location. If the PRACH configuration and the resource location are different from parameters designated by a primary cell, the UE may be notified of the PRACH configuration and the resource location.

Meanwhile, rules regarding the priority of the existing 3GPP Release-10 may be kept with respect to a collision between a PRACH for the same cell and another uplink channel.

However, a collision may occur between PRACHs for different cells and uplink channels. Accordingly, UE procedures and priority rules for solving the collision are described below.

<A Collision Between PRACHs and PUCCHs/PUSCHs/SRSs for Different Cells or Cell Groups>

In a first scheme, the UE 100 may give high priority to uplink channels corresponding to a primary cell. In this case, information corresponding to the primary cell may be dropped. If a collision occurs with respect to primary cells or secondary cells, high priority may be set from a smaller cell index. Furthermore, a PUCCH may include UCI, such as HARQ-ACK, CSI, and an SR, and a PUSCH may include a combination of an UL-SCH, periodic/aperiodic CSI, HARQ-ACK, etc.

In a second scheme, the UE 100 may give high priorities in order of a PRACH, an HARQ-ACK/SR, PUSCH (i.e., msg3) corresponding to a random access grant, an aperiodic CSI/SRS, periodic CSI, a periodic SRS, and an UL-SCH. If a collision occurs with respect to primary cells or secondary cells, high priority is set from a smaller cell index.

In a third scheme, the UE 100 may give priorities in order of a PUSCH (i.e., msg3) corresponding to a random access grant, a PRACH, an HARQ-ACK/SR, an aperiodic CSI/SRS, periodic CSI, a periodic SRS, and an UL-SCH. If a collision occurs with respect to primary cells or secondary cells, high priority is set from a smaller cell index. A ground on which high priorities is set to msg3 over a PRACH may mean that high priority is given to an existing random access procedure.

In a fourth scheme, the UE 100 may give high priorities in order of a PRACH, an HARQ-ACK/SR, an aperiodic CSI/SRS, periodic CSI, a periodic SRS, and an UL-SCH. If a collision occurs with respect to primary cells or secondary cells, high priority is set from a smaller cell index.

The aforementioned priority may be differently set for each subframe may be designated in advance or configured through a higher layer signal. In this case, an example of a scheme for previously designating priority may mean the setting of priority based on a subframe corresponding to a specific cell or a specific cell group.

<A Collision Between the PRACHs of Different Cells or Cell Groups>

In a first scheme, the UE 100 may give high priority to a PRACH corresponding to a primary cell, a PRACH corresponding to a secondary cell may be dropped. If a collision occurs with respect to primary cells or secondary cells, high priority may be set from a smaller cell index.

In a second scheme, the UE 100 simultaneously sends a plurality of PRACHs. In this case, if methods of sending PRACHs are the same, only a PRACH that belongs to corresponding PRACHs and that is for a single cell or cell group may be transmitted. In this case, the method of sending the PRACH may be represented by a PRACH configuration, a PRACH preamble index, etc. The selected PRACH may correspond to a cell having a small serving cell index and may correspond to a cell having an earlier location in a downlink subframe from a viewpoint of corresponding UE.

In a third scheme, the UE 100 does not send any PRACH when a collision occurs.

In a fourth scheme, the UE 100 may select a PRACH to be transmitted based on priority between dynamically configured PRACHs. In this case, an example of a method of dynamically configuring PRACHs may include an example in which information included in PDCCH order is used.

The priority when the collision occurs may be differently set for each subframe and may be designated in advance or configured through a higher layer signal. A method of previously designating priority may be based on a subframe corresponding to a specific cell or cell group.

Figure 17A:
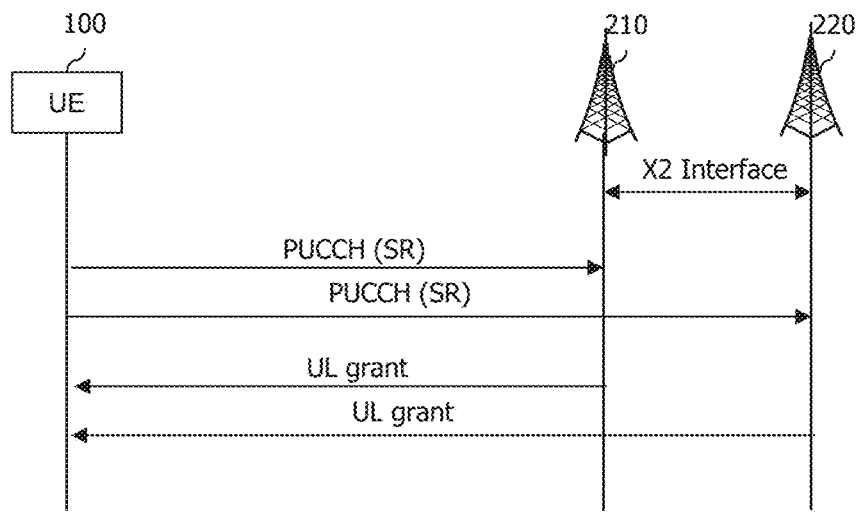
FIGS. 17A and 17B illustrate procedures regarding a Scheduling Request (SR) in a multi-cell environment.
Figure 17B:
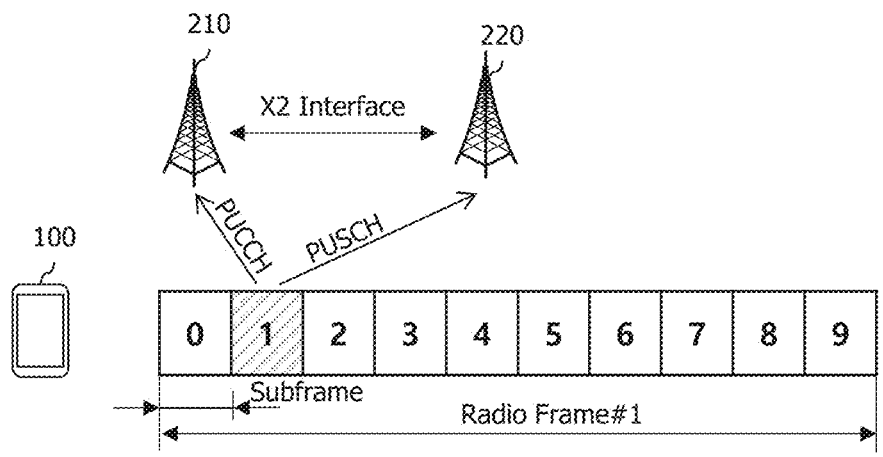

FIGS. 17A and 17B illustrate procedures regarding a Scheduling Request (SR) in a multi-cell environment.

If the primary cell 210 and the secondary cell 220 correspond to eNodeBs geographically spaced apart from each other as in an inter-site CA, a method of sending, by the UE 100, a Scheduling Request (SR) to only a specific one cell may be inefficient because the exchange of pieces of information between cells is not smooth.

Accordingly, as illustrated in FIG. 17A, the UE 100 may send an SR to each cell (or cell group). Configuration information may be transmitted to the UE 100 through a higher layer signal so that the UE 100 is able to send the SR to each cell as described above. When sending the SR, the UE 100 may include information about a cell, corresponding to the SR, in the SR and send the SR. Each cell allocates uplink resources in response to the SR from the UE 100 and sends an uplink grant (or also called an UL grant) including information about the allocated uplink resources.

Detailed examples of an SR transmission scheme are described below.

In a first scheme, each cell may configure an SR transmission method for UE and share the configured SR transmission method with other cells through an illustrated X2 interface. In this case, the SR transmission method may be determined by an SR configuration index and/or PUCCH resources for sending an SR.

In a second scheme, a transmission time, PUCCH resources, etc. are configured so that all the cells, that is, the subject of a carrier aggregation (CA), are able to detect an SR from the UE 100. In this case, if the UE 100 sends the SR, all the cells, that is, the subject of a carrier aggregation (CA), receive the SR from the UE 100.

In a third scheme, the UE 100 may include information about a cell, corresponding to an SR, in a PUCCH along with the SR and send the PUCCH. In this case, the information about a cell may be a serving cell index. Resources for the PUCCH may be different for each cell. Furthermore, in order to send the SR, the UE 100 may use the PUCCH format 3.

Whether or not to actually apply the aforementioned schemes may be automatically indicated for UE through a higher layer signal.

Meanwhile, as illustrated in FIG. 17B, a collision may occur if an SR for the primary cell 210 and uplink channels for the secondary cell 220 are simultaneously transmitted in a single subframe. In this case, the UE 100 may set priority for the SR depending on the type of information included in an uplink channel. Detailed embodiments of the setting priority are described below.

<A Collision Between a PUCCH Including an SR and a PUCCH/PUSCH Including HARQ-ACK>

Although the UE 100 has not been configured to simultaneously transmit a PUCCH and a PUSCH, if a collision occurs because a simultaneous transmission condition between a PUCCH including an SR and a PUCCH/PUSCH including HARQ-ACK is generated, the UE 100 may select any one of the following several schemes and operate according to the selected scheme.

In this case, the PUCCH including HARQ-ACK may send only HARQ-ACK or include an SR for a corresponding cell in the case of the PUCCH formats 1a/1b. The PUCCH including HARQ-ACK may include CSI in the case of the PUCCH formats 2/2a/2b. The PUCCH including HARQ-ACK may include HARQ-ACK only feedback/HARQ-ACK+SR/HARQ-ACK+CSI/HARQ-ACK+SR+CSI, etc. in the case of the PUCCH format 3. If HARQ-ACK is transmitted through a PUSCH, the PUCCH may include periodic/aperiodic CSI, an UL-SCH, etc. The PUCCH including an SR may be transmitted according to the PUCCH formats 1/1a/1b/3 depending on the type of UCI included in the PUCCH. The following is a more detailed example of UE procedures when a collision occurs.

In a first scheme, the UE 100 may give high priority to UCI and a container corresponding to a primary cell. In this case, information corresponding to a secondary cell is dropped. If a collision occurs between secondary cells, high priority may be set from a smaller cell index.

In a second scheme, the UE 100 may give high priority to a PUCCH/PUSCH including HARQ-ACK. If all PUCCHs between which collisions have occurred include HARQ-ACK, high priority is set from a smaller cell index. In this case, an SR not included in a PUCCH having the highest priority may be dropped.

In a third scheme, the UE 100 may simultaneously send part of or the entire UCI using common uplink channel resources. In this case, the UE 100 may additionally perform a process for reducing some of or all the number of bits of the UCI. The uplink channel resources may be previously designated or configured by a higher layer. If a collision occurs between uplink channels, the UE 100 may use the resources that have been previously designated or configured by a higher layer.

In a fourth scheme, the UE 100 selects a container to be transmitted through a higher layer, includes part of or the entire UCI in the container, and sends the container.

The selected container may have been dedicated to a corresponding cell. That is, each cell performs DTX detection only on its own container. The priority when the collision occurs may be differently set for each subframe. This may be designated in advance or configured through a higher layer signal.

<A PUCCH Including an SR and a PUCCH/PUSCH not Including HARQ-ACK>

Although the UE 100 has not been configured to simultaneously transmit a PUCCH and a PUSCH, if a collision occurs because a PUCCH including an SR and a PUCCH/PUSCH not including HARQ-ACK are simultaneously transmitted, the UE 100 may select any one of the following several schemes and operate according to the selected scheme.

In this case, uplink channels not including HARQ-ACK may include periodic/aperiodic CSI, an UL-SCH, etc. Furthermore, the PUCCH including an SR may be transmitted according to the PUCCH formats 1/1a/1b/3 depending on the type of UCI included in the PUCCH. The following is a more detailed example of UE procedures when a collision occurs.

In a first scheme, the UE 100 may give high priority to UCI and a container corresponding to a primary cell. In this case, information corresponding to a secondary cell is dropped. If a collision occurs between secondary cells, high priority may be set from a smaller cell index.

In a second scheme, the UE 100 may give high priority to a PUCCH including an SR. In this case, UCI not included in a PUCCH having the highest priority is dropped.

In a third scheme, the UE 100 simultaneously sends part of or the entire UCI using PUCCH resources. In this case, the UE 100 may additionally perform a process for reducing some of or all the number of bits of the UCI. The PUCCH resources may be previously designated or configured by a higher layer. If a collision occurs, the UE 100 may use the resources that have been previously designated or configured by a higher layer.

In a fourth scheme, the UE 100 selects a container to be transmitted through a higher layer signal, includes part of or the entire UCI in the container, and sends the container. In this case, the container to be transmitted may be selected using a PUCCH resource index.

The selected container may have been dedicated to a corresponding cell. That is, each cell performs DTX detection only on its own container. The priority when the collision occurs may be differently set for each subframe. This may be designated in advance or configured through a higher layer signal.

Figure 18:
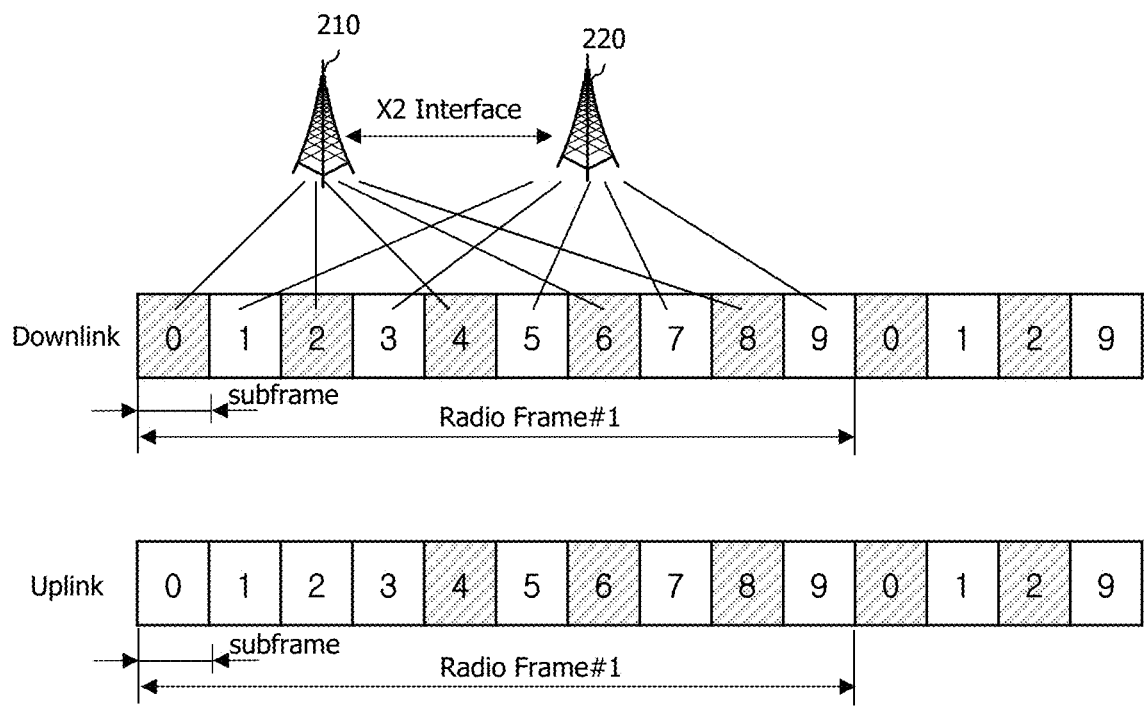
FIG. 18 illustrates an example of scheduling regarding uplink channels in a multi-cell environment.

FIG. 18 illustrates an example of scheduling regarding uplink channels in a multi-cell environment.

When a plurality of cells schedules their uplink channels on a single uplink CC, a collision may occur between the uplink channels. Accordingly, a procedure for preventing the collision or enabling UE to handle the collision is required. The uplink channels may include a combination of an UL-SCH, aperiodic CSI, and an aperiodic SRS. Detailed schemes for the procedure are described below.

IN a first scheme, if an uplink grant is received on an $n^{th}$ downlink subframe, an uplink channel can be transmitted on an $(n+k)^{th}$ (e.g., $(n+4)^{th}$) uplink subframe. Accordingly, each cell may avoid a collision between uplink channels by configuring a subframe in which the uplink grant can be transmitted. To this end, each cell segments uplink resources in advance. For example, in FDD, if the number of cells is 2, one cell may send an uplink grant through even-numbered subframe indices (e.g., Nos. 0, 2, 4, 6, and 8 subframes illustrated), and the other cell may send an uplink grant through odd-numbered subframe indices (e.g., Nos. 1, 3, 5, 7, and 9 subframes illustrated). Each cell may notify UE of the configuration of a subframe in which an uplink grant can be transmitted through uplink signaling. The configuration of the subframe may also be exchanged between cells. Furthermore, the configuration of a subframe in which an uplink grant can be transmitted may be cell-specific or may be UE-specific. If the configuration of a subframe in which an uplink grant can be transmitted is cell-specific, each cell or cell group may designate the subframe in which the uplink grant is to be transmitted in advance and exchange it with other cells through an X2 interface, etc. If the configuration of a subframe in which an uplink grant can be transmitted is UE-specific, each cell or cell group notifies other cells of the configuration.

In a second scheme, after an uplink subframe is allocated to each cell or cell group, configuration information may be shared with another cell. In this case, the allocation of the subframe may be cell-specific or may be UE-specific. Each cell may notify UE of the configuration information through an uplink signal. For example, in FDD, one cell may send uplink channels through even-numbered subframe indices, and the other cell may send uplink channels through odd-numbered subframe indices. If an uplink subframe in which uplink transmission is to be performed is not a subframe allocated by a cell, the UE 100 may drop or delay the uplink transmission or may request scheduling from the cell again.

In a third scheme, UE may autonomously configure an uplink subframe for each CC and notify each cell of the configured uplink subframe. Each cell may refer to a subframe configured by corresponding UE in scheduling uplink resources. If a subframe allocated by each cell is not a subframe configured by the corresponding UE 100, the corresponding UE 100 may drop or delay uplink transmission or may request scheduling from the cell again.

In a fourth scheme, UE may equally partition uplink subframes between cells and allocate them. When equally partitioning the uplink subframes, the UE 100 may classify the subframes using respective cell IDs. For example, if a cell 0 and a cell 1 share a single uplink CC, the UE 100 may allocate even-numbered subframes to the cell 0 and allocate odd-numbered subframes to the cell 1. If each cell is aware of the number of CCs allocated to UE, each cell may reason a subframe allocated by the UE even without additional information. In the case of TDD, available uplink subframes may be distributed.

In this case, if resources for an uplink grant are partitioned for each cell or cell group, the UE 100 may restrict a search space when detecting a PDCCH for a corresponding cell or cell group based on resources information for the corresponding cell or cell group. Accordingly, the number of blind decodings performed by UE can be reduced. In the case of a periodic Sounding Reference Signal (SRS), a collision between periodic SRSs can be reduced in such a way as to share or allocate SRS to be used for each cell or cell group in advance or through a higher layer signal. In addition to the partitioning of a subframe, a method of partitioning resources within a subframe and using them as FDM may be taken into consideration. In order for the resources to be used as FDM as described above, it is assumed that cells that share an uplink CC have been subjected to time synchronization.

<Scheduling of Uplink Channels Between Multiple Cells in TDD>

The following is a detailed example of a scheme for partitioning an uplink subframe for each cell or for each cell group in a TDD system. For convenience sake, one cell (or cell group) is indicated by a CG_A, and the other cell (or cell group) is indicated by a CG_B. The CG_A and the CG_B may have an intra-site or inter-site eNodeB relationship. Furthermore, an uplink CC may basically correspond to a primary cell. That is, if two or more types of UL-DL configurations are used, uplink subframes that may be actually transmitted are based on an UL-DL configuration corresponding to a primary cell. The following is a detailed example in which UL-DL configurations are the same with respect to all the cells or the uplink subframe numbers of an UL-DL configuration corresponding to a primary cell are a subset form of uplink subframe numbers of an UL-DL configuration corresponding to a secondary cell.

First, if the UL-DL configuration of a primary cell is 1 illustrated in Table 1, uplink subframes corresponding to the subframe numbers 2, 3, 7, and 8 are distributed to the CG_A, and uplink subframes corresponding to the subframe numbers 4 and 9 are distributed to the CG_B. In the above condition, the UL grant for the CG_A may be transmitted through subframe numbers 0, 1, 5, and 6. In this case, in the case of the subframe numbers 0 and 5, the MSB of an UL index may be limited to 0. Furthermore, an UL grant for the CG_B may be transmitted through the subframe numbers 0 and 5. In this case, the LSB of an uplink index may be limited to 0.

Thereafter, first, if the UL-DL configuration of a primary cell is 1, 2, 3, 4, and 6 illustrated in Table 1, uplink subframes may be distributed to the CG_A and the CG_B exclusively.

Meanwhile, the aperiodic CSI of UE is described below. In particular, in an inter-site CA condition, to request aperiodic CSI from the other cell that is geographically spaced apart from one cell through an uplink grant for one cell may be inefficient. Accordingly, if UCI is dedicated and transmitted for each cell, the number of bits for an aperiodic CSI request may be set using the number of cells that provide downlink as a parameter. For example, if the number of cells that provide downlink is 3, a first cell group includes one cell that provides downlink, and a second cell group includes two cells that provide downlink, the number of bits of an aperiodic CSI request for the first cell group may be set to 1, and the number of bits of an aperiodic CSI request for the second cell group may be set to 2. In this case, 1-bit information about the request may be used to determine whether or not to send aperiodic CSI to a serving cell or a cell group including a serving cell. Furthermore, if UCI is configured to be dedicated and transmitted for each corresponding cell, if simultaneous transmission or shortened PUCCH use has been configured between an SRS and a PUCCH with respect to a primary cell, the same may be identically configured with respect to all the cells that share an uplink CC. In this case, the meaning that the UCI is dedicated and transmitted to each corresponding cell may mean that a power configuration, a scrambling sequence configuration, a resources configuration, etc. are performed on UCLA for a cell_A based on the cell_A, for example.

The following is a detailed example of procedures performed by UE when a collision occurs between uplink channels based on an uplink grant.

<A Collision Between UCI and an UL-SCH>

Although the UE 100 has not been configured to simultaneously send a PUCCH and a PUSCH, if a collision occurs because a condition in which HARQ-ACK, a PUCCH including periodic/aperiodic CSI, and a PUSCH including an UL-SCH are simultaneously transmitted is generated, a detailed example of UE procedures is as follows.

In a first scheme, high priority may be set to information and a container corresponding to a primary cell. In this case, information corresponding to a secondary cell is dropped. If a collision occurs between secondary cells, high priority may be set from a smaller cell index.

In a second scheme, if resources for two UL-SCHs do not overlap with each other, the UE 100 may simultaneously send the two UL-SCHs through respective PUSCHs. In this case, the resources mean scheduled RBs.

In a third scheme, priorities are given in order of HARQ-ACK, aperiodic CSI, and an UL-SCH (also periodic CSI). Thereafter, uplink channels corresponding to some of or the entire information are transmitted in priority order. If a collision occurs between secondary cells, high priority is set from a smaller cell index.

In this case, whether or not to perform drop and simultaneous transmission may be set through a higher layer signal. The priority when the collision occurs may be differently set for each subframe. This may be designated in advance or configured through a higher layer signal. In this case, an example of the method of designating priority in advance may be limited to the setting of priority based on a subframe corresponding to a specific cell/cell group.

<A Collision Between SRSs>

If UCI has been set to be dedicatedly transmitted in each corresponding cell, an SRS may also be dedicately transmitted in each corresponding cell and may be transmitted so that it is detected by all the cells using a common parameter. In this case, the SRS may be divided into a periodic SRS and an aperiodic SRS, and UE procedures for the periodic SRS and the aperiodic SRS may be separately configured. The following is a more detailed example.

In a first scheme, high priority may be set to an SRS corresponding to a primary cell. In this case, information corresponding to a secondary cell is dropped. If a collision occurs between secondary cells, high priority may be set from a smaller cell index.

In a second scheme, high priorities may be given in order of an aperiodic SRS and a periodic SRS. If a collision occurs between secondary cells, high priority is set from a smaller cell index.

In a third scheme, if resources for two SRSs do not overlap with each other, the UE 100 simultaneously sends the two SRSs. In this case, the resources may mean SRS bandwidths.

The priority when the collision occurs may be differently set for each subframe. This may be designated in advance or configured through a higher layer signal.

<A Collision Between an SRS and a PUCCH>

First, a PUCCH may include a combination of HARQ-ACK, periodic CSI, an SR, etc. and may be transmitted in a shortened form with respect to a specific format. In this case, the shortened form may mean that the last OFDM symbol is not used upon PUCCH transmission. Notification may be provided of whether or not to apply the shortened form to each cell through a higher layer signal. Basically, with respect to the same cell, priorities may be set in order of feedback including HARQ-ACK (or an SR), an aperiodic SRS, the feedback of periodic CSI, and a periodic SRS. The following is a more detailed example of UE procedures when a collision occurs between an SRS and a PUCCH for different cells.

In a first scheme, high priority may give an uplink channel corresponding to a primary cell. In this case, information corresponding to a secondary cell may be dropped. If a collision occurs between secondary cells, high priority may be set from a smaller cell index.

In a second scheme, the UE 100 sets priorities in order of feedback including HARQ-ACK (or an SR), an aperiodic SRS, periodic CSI-only feedback, and a periodic SRS.

The priority when the collision occurs may be differently set for each subframe. This may be designated in advance or configured through a higher layer signal.

<PUSCH Hopping>

As described above, although uplink subframes have been divided and allocated for each cell, there is a possibility that UE may use the subframe of another cell while performing PUSCH hopping. Accordingly, if a plurality of cells has been configured to share a single uplink CC and schedule respective uplink channels, whether UE performs PUSCH hopping when sending a PUSCH to each cell may be separately set according to a scheduling restriction method for each cell (or cell group). If the scheduling restriction method is set as a TDM method, whether or not to apply the PUSCH hopping and a method of applying the PUSCH hopping may be independently configured for each cell (each cell group). If the scheduling restriction method is set as an FDM method, PUSCH hopping may always be not used, and the results of PUSCH hopping may be configured so that they overlap with each other between cells (cell groups). In this case, an example of a method of configuring the results of the PUSCH hopping so that they do not overlap with each other may be set to be identical with a hopping bit value within an uplink grant corresponding to all the cells that share an uplink CC.

The exemplary embodiments of the present invention which has been described up to now may be implemented through various means. For example, the exemplary embodiments of the present invention may be implemented by hardware, firmware, software, or combinations thereof. This is described in detail with reference to the drawing below.

Figure 19:
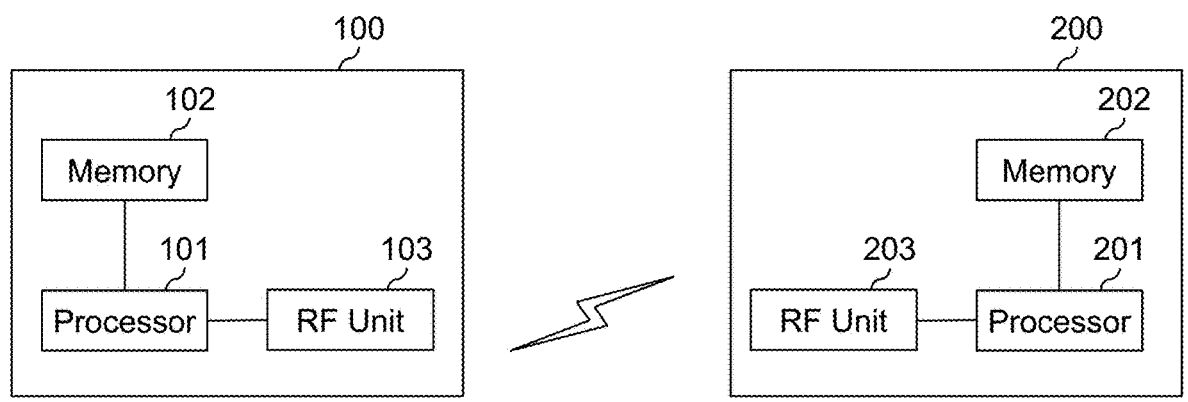
FIG. 19 is a block diagram illustrating a wireless communication system in which an embodiment of the present invention is implemented.

FIG. 19 is a block diagram illustrating a wireless communication system in which an embodiment of the present invention is implemented.

The base station 200 includes a processor 201, a memory 202, and an RF (radio frequency) unit 203. The memory 202 is connected with the processor 201 and stores various pieces of information for driving the processor 201. The RF unit 203 is connected with the processor 201 and transmits and/or receives radio signals. The processor 201 implements functions, processes, and/or methods as suggested herein. In the above-described embodiments, the operation of the base station may be implemented by the processor 201.

The wireless device 100 includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements functions, processes, and/or methods as suggested herein. In the above-described embodiments, the operation of the wireless device may be implemented by the processor 101.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention. The present invention may be used in a user equipment, a base station, or other equipment of a wireless mobile communication system.

What is claimed is:

1. An uplink transmission method, the method performed by a single user equipment (UE) and comprising:
   determining, by the single UE configured with a first cell group and a second cell group, whether a first uplink channel transmission toward the first cell group is overlapped in a subframe with a second uplink channel transmission toward the second cell group;
   determining, by the single UE, whether to transmit both or one of the first uplink channel transmission and the second uplink channel transmission, based on the determining that the first uplink channel transmission is overlapped with the second uplink channel transmission; and
   performing, by the single UE, both of the first uplink channel transmission and the second uplink channel transmission based on the determining that the first uplink channel transmission is overlapped with the second uplink channel transmission,
   wherein the first uplink channel transmission includes a first a physical random access channel (PRACH) transmission and the second uplink channel transmission includes a second PRACH transmission.

2. The uplink transmission method of claim 1, wherein the first uplink channel transmission further includes a first transmission for a first scheduling request (SR) and the second uplink channel transmission further includes a second transmission for a second SR,
   wherein each of the first and the second SRs comprises information about a corresponding cell.

3. The uplink transmission method of claim 2, further comprising receiving control information on the second SR.

4. The uplink transmission method of claim 2, further comprising:
   receiving a first uplink grant for the first SR; and
   receiving a second uplink grant for the second SR,
   wherein the first uplink grant and the second uplink grant are received on different subframes.

5. The uplink transmission method of claim 1, further comprising performing a hopping of radio resources for the second uplink channel.

6. The uplink transmission method of claim 1,
   wherein both of the first uplink channel transmission and the second uplink channel transmission are performed based on a priority.

7. The uplink transmission method of claim 1, wherein the second uplink channel transmission further includes a physical uplink shared channel (PUSCH) transmission including a hybrid automatic repeat request (HARQ) acknowledgement (ACK)/negative-acknowledgement (NACK).

8. The uplink transmission method of claim 1,
   wherein the first uplink channel transmission further includes a first physical uplink control channel (PUCCH) transmission, and
   wherein the second uplink channel transmission further includes a second PUCCH transmission.

9. The uplink transmission method of claim 1, wherein based on that the second uplink channel transmission further includes a transmission of a HARQ ACK/NACK, the second uplink channel transmission is prioritized over the first uplink channel transmission.

10. The uplink transmission method of claim 1, wherein based on that the second uplink channel transmission does not include a transmission for a HARQ ACK/NACK, the first uplink channel transmission is prioritized over the second uplink channel transmission.

11. A single user equipment for performing uplink transmission, the user equipment comprising:
   a transceiver which is configured with a first cell group and a second cell group and transmits and receives signals; and
   a processor operatively connected to the transceiver and is configured to:
      determine whether a first uplink channel transmission toward the first cell group is overlapped in a subframe with a second uplink channel transmission toward the second cell group;

determine whether to transmit both or one of the first uplink channel transmission and the second uplink channel transmission, based on the determine that the first uplink channel transmission is overlapped with the second uplink channel transmission; and perform both of the first uplink channel transmission and the second uplink channel transmission based on the determine that the first uplink channel transmission is overlapped with the second uplink channel transmission, wherein the first uplink channel transmission includes a first a physical random access channel (PRACH) transmission and the second uplink channel transmission includes a second PRACH transmission.

12. The user equipment of claim 11, wherein the first uplink channel transmission further includes a first transmission for a first scheduling request (SR) and the second uplink channel transmission further includes a second transmission for a second SR, wherein each of the first and the second SRs comprises information about a corresponding cell.

* * * * *